United States Patent
Kim et al.

(10) Patent No.: US 12,322,320 B2
(45) Date of Patent: Jun. 3, 2025

(54) SEAMLESS SCREEN DISPLAY DURING EXPANSION OR REDUCTION OF A FLEXIBLE DISPLAY OF AN ELECTRONIC DEVICE

(71) Applicant: SAMSUNG ELECTRONICS CO., LTD., Suwon-si (KR)

(72) Inventors: Seungjin Kim, Suwon-si (KR); Mooyoung Kim, Suwon-si (KR); Joonyung Park, Suwon-si (KR); Donghyun Yeom, Suwon-si (KR); Gwanghui Lee, Suwon-si (KR); Minwoo Lee, Suwon-si (KR); Woojun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 18/122,372

(22) Filed: Mar. 16, 2023

(65) Prior Publication Data

US 2023/0222959 A1    Jul. 13, 2023

Related U.S. Application Data

(63) Continuation of application No. PCT/KR2021/012736, filed on Sep. 16, 2021.

(30) Foreign Application Priority Data

Nov. 16, 2020   (KR) .................. 10-2020-0152849
Jan. 6, 2021   (KR) .................. 10-2021-0001361

(51) Int. Cl.
*G09G 3/20*    (2006.01)
*G09G 3/00*    (2006.01)

(52) U.S. Cl.
CPC .......... *G09G 3/2096* (2013.01); *G09G 3/035* (2020.08); *G09G 2320/0686* (2013.01);
(Continued)

(58) Field of Classification Search
None
See application file for complete search history.

(56) References Cited

U.S. PATENT DOCUMENTS 10,317,944 B2    6/2019   Kummer et al.
2011/0291915 A1*   12/2011   Tani .................... H04M 1/0235
                                                    345/1.3
(Continued)

FOREIGN PATENT DOCUMENTS

KR    10-2016-0018830 A    2/2016
KR    10-2017-0024942 A    3/2017
KR    10-2017-0062121 A    6/2017

OTHER PUBLICATIONS

Korean Office Action dated Feb. 3, 2025 for KR Application No. 10-2021-0001361.

*Primary Examiner* — Anh-Tuan V Nguyen
(74) *Attorney, Agent, or Firm* — Nixon & Vanderhye P.C.

(57) ABSTRACT

An electronic device according to various embodiments comprises: a flexible display including a main display region and at least one extendable display region that can be extended from the main display region; and a processor operatively connected to the display, wherein the processor is configured to: control the display to display first content on the main display having a first size while the electronic device is in a slide-in state, slide the display out to extend same to a second size based on touch input information about the display region being received, control the display to display second content on the extendable display region or the entire display region while the state of the electronic state is being switched into a slide-out state, and complete (Continued)

displaying of the second content and display the first content on at least a part of the display based on switching of the state of the electronic state to the slide-out state being completed.

19 Claims, 18 Drawing Sheets

(52) U.S. Cl.
CPC . *G09G 2320/08* (2013.01); *G09G 2340/0407* (2013.01); *G09G 2354/00* (2013.01); *G09G 2356/00* (2013.01)

(56) References Cited

U.S. PATENT DOCUMENTS

| | | | |
|---|---|---|---|
| 2012/0280924 A1* | 11/2012 | Kummer | G06F 1/1641 |
| | | | 345/173 |
| 2013/0201208 A1* | 8/2013 | Cho | G06F 3/0488 |
| | | | 345/619 |
| 2015/0378393 A1* | 12/2015 | Erad | G06F 3/1446 |
| | | | 345/1.3 |
| 2017/0061932 A1 | 3/2017 | Kwon et al. | |
| 2018/0018929 A1* | 1/2018 | Xun | G06F 1/1626 |
| 2018/0352191 A1* | 12/2018 | Eppolito | G09G 5/024 |
| 2018/0374411 A1* | 12/2018 | Yang | G06F 3/0488 |
| 2020/0320326 A1* | 10/2020 | Dou | A61B 6/469 |
| 2023/0115097 A1* | 4/2023 | Asokan | H04N 21/43632 |
| | | | 375/240.24 |

* cited by examiner

SEAMLESS SCREEN DISPLAY DURING EXPANSION OR REDUCTION OF A FLEXIBLE DISPLAY OF AN ELECTRONIC DEVICE

CROSS-REFERENCE TO RELATED APPLICATIONS

This application is a continuation of International Application No. PCT/KR2021/012736 designating the United States, filed on Sep. 16, 2021, in the Korean Intellectual Property Receiving Office and claiming priority to Korean Patent Application No. 10-2020-0152849, filed on Nov. 16, 2020, in the Korean Intellectual Property Office, and to Korean Patent Application No. 10-2021-0001361, filed on Jan. 6, 2021, in the Korean Intellectual Property Office, the disclosures of all of which are incorporated by reference herein in their entireties.

BACKGROUND

Field

The disclosure relates to an electronic device and, for example, to a method for controlling a screen in an electronic device including a flexible display.

Description of Related Art

With the development of mobile communication and hardware/software technology, a portable electronic device (hereinafter, an electronic device) represented by a smartphone has evolved and thus can be equipped with various functions. The electronic device may include a touch screen-based display so that a user can easily access various functions, and may provide screens of various applications via the display.

Recently, in order to provide various user experiences and satisfy spatial efficiency, electronic devices having displays of various form factors are being developed. For example, an electronic device may be equipped with an expandable display such as a slidable or rollable display.

When a display of an electronic device is expanded or reduced and a resolution is changed in real time, an abnormal screen may be continuously output or an unnecessary black area may be generated.

In addition, when a display of an electronic device is expanded or reduced, a user may perform a folding or unfolding operation while touching an area of the display. Since the display and a touch sensor of the display are in an active state even during such the operation, a touch input unintended by the user may be detected through the touch sensor.

SUMMARY

Embodiments of the disclosure provide an electronic device and a control method of the electronic device, wherein the electronic device provides seamless screen display even during an operation in which a display of the electronic device is expanded or reduced, and processes, suitably for a user's intention, a touch event generated by a touch input during expansion or reduction of the display of the electronic device.

An electronic device according to various example embodiments may include: a flexible display including a main display area and at least one expandable display area expandable from the main display area, and a processor operatively connected to the display, wherein the processor is configured to: control the display to display a first content on the main display having a first size while the electronic device is in a slide-in state, slide the display out to expand the display to a second size based on touch input information of the display area being received, control the display to display a second content in the expandable display area or the entire display area while the state of the electronic device is being switched into a slide-out state, and terminate displaying of the second content and control the display to display the first content on at least a part of the display based on the switching of the state of the electronic device into the slide-out state being completed.

An electronic device according to various example embodiments may further include: a housing, a flexible display including a bendable section, at least a part of which is configured to be inserted into or withdrawn from an inner space of the housing, and a processor operatively connected to the display, wherein the processor is configured to: control the display to display a first content on the display having a first size, slide the display in to reduce the display to a second size less than the first size based on touch input information of the display area being received, and control the display to additionally display a second content in the display area while the electronic device is in a slide-in state.

A screen control method of an electronic device according to various example embodiments may include: displaying a first content on a main display having a first size, sliding the display out to expand the display to a second size exceeding the first size based on touch input information of a display area being received, and displaying a second content in an expandable display area or the entire display area while the state of the electronic device is being switched into a slide-out state.

According to various example embodiments, an electronic device including a flexible display may maintain the resolution of the display even during an operation in which the display is expanded or reduced, and provide seamless screen display, so as to improve a user's satisfaction. Further, the electronic device may process, suitably for a user's intention, a touch event generated by a touch input during expansion or reduction of the display of the electronic device, so as to provide convenience to the user.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the accompanying drawings.

Figure 1:
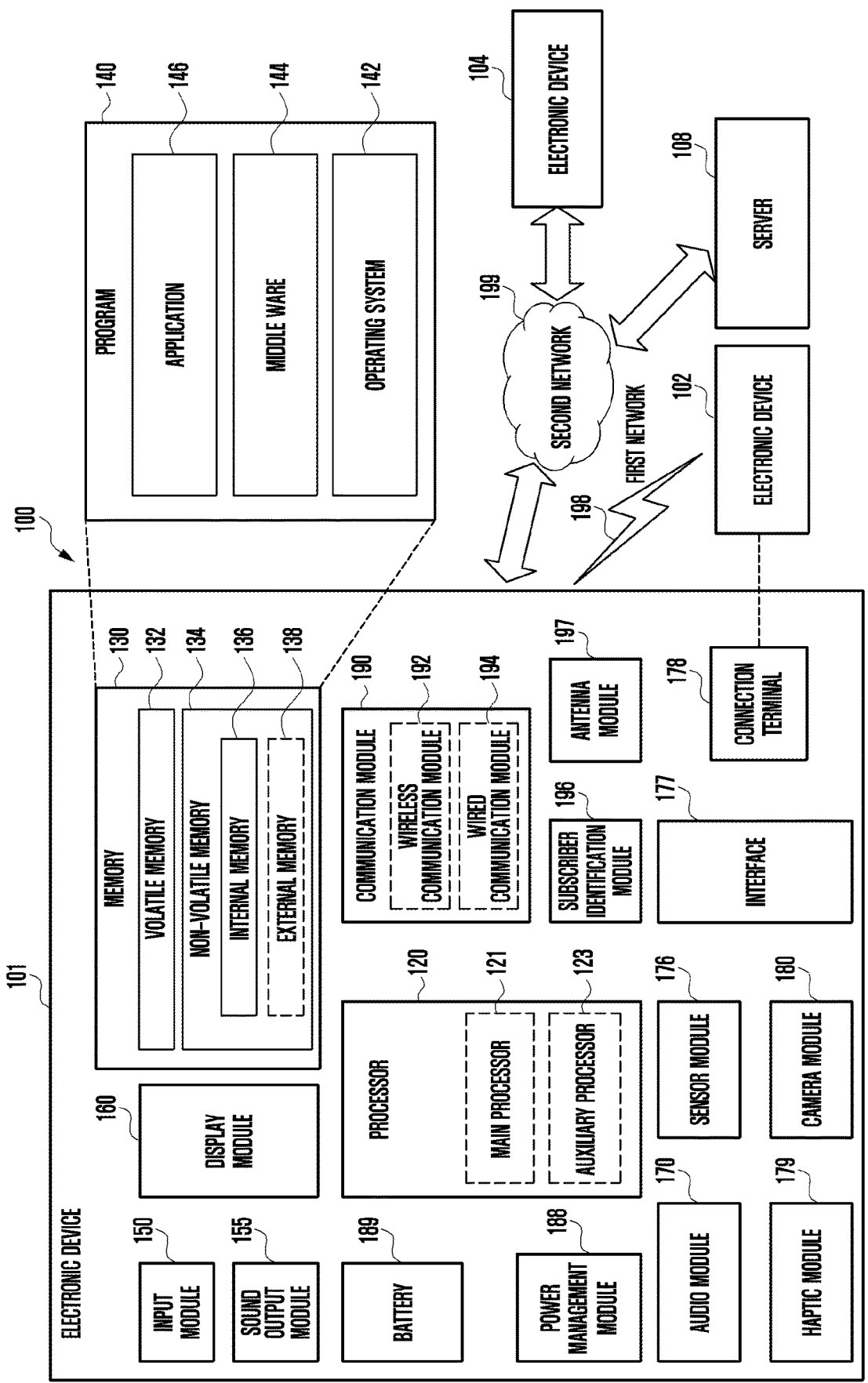
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
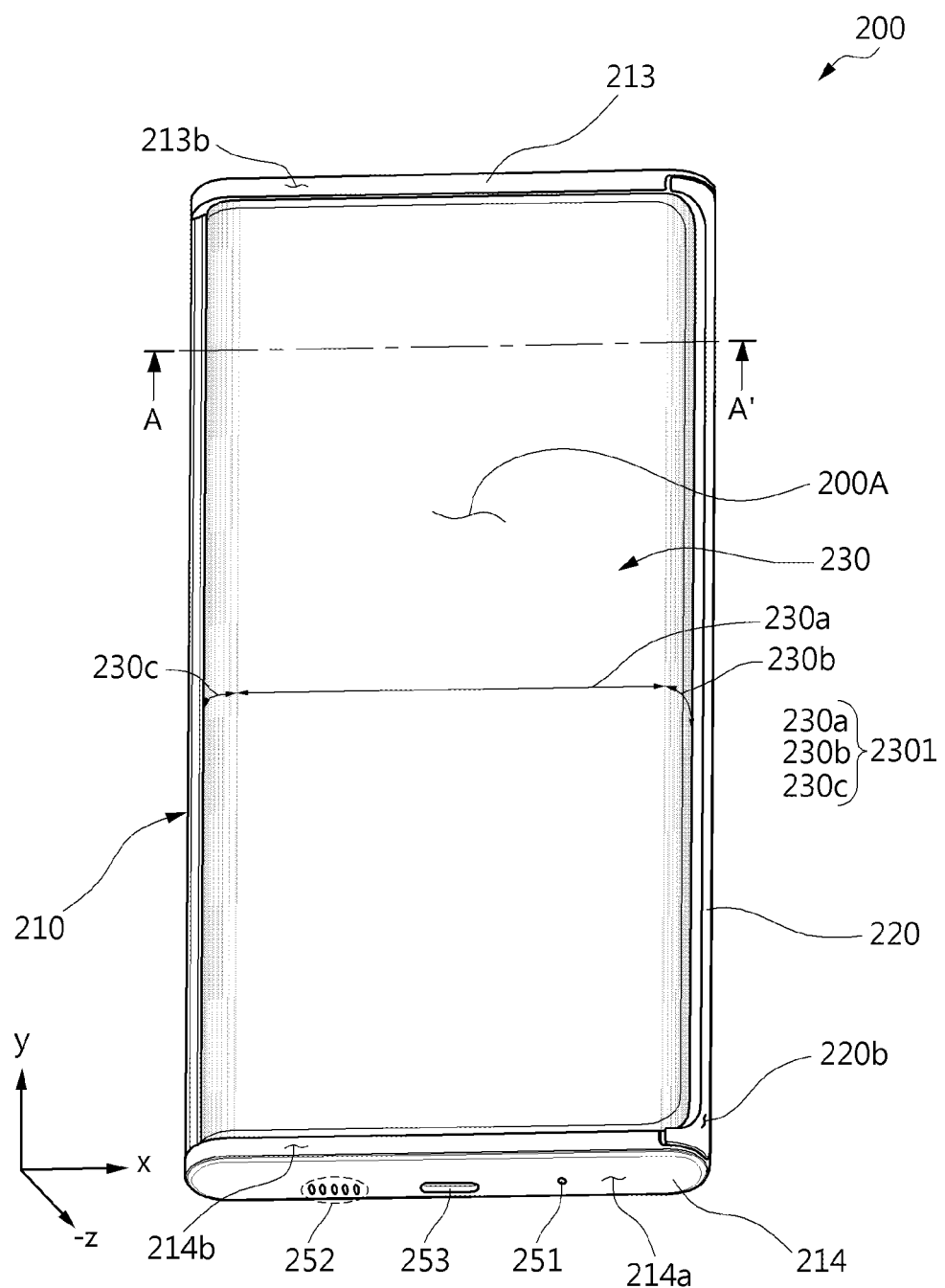
FIG. 2A is a front perspective view of an electronic device in a closed state according to various embodiments.
Figure 2B:
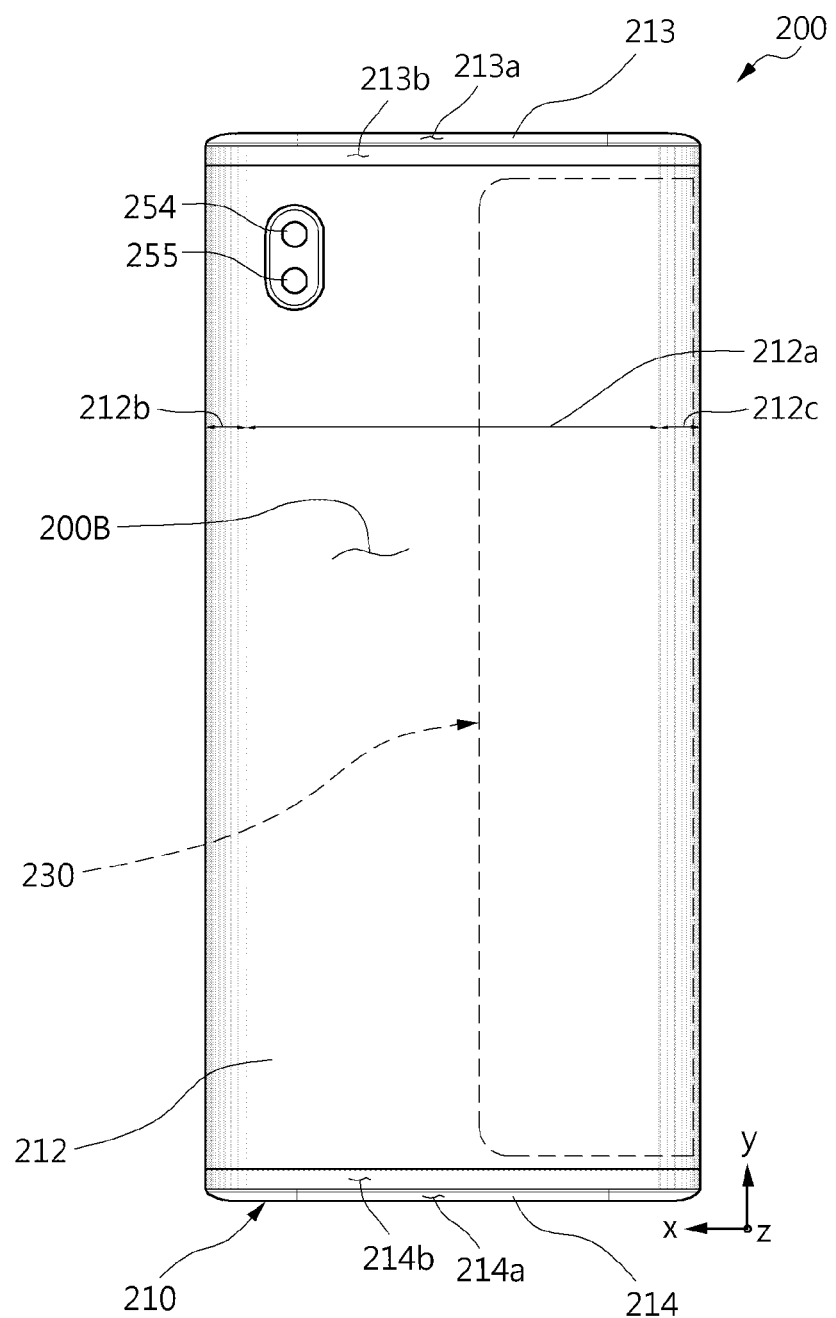
FIG. 2B is a rear perspective view of the electronic device in a closed state according to various embodiments.
Figure 3A:
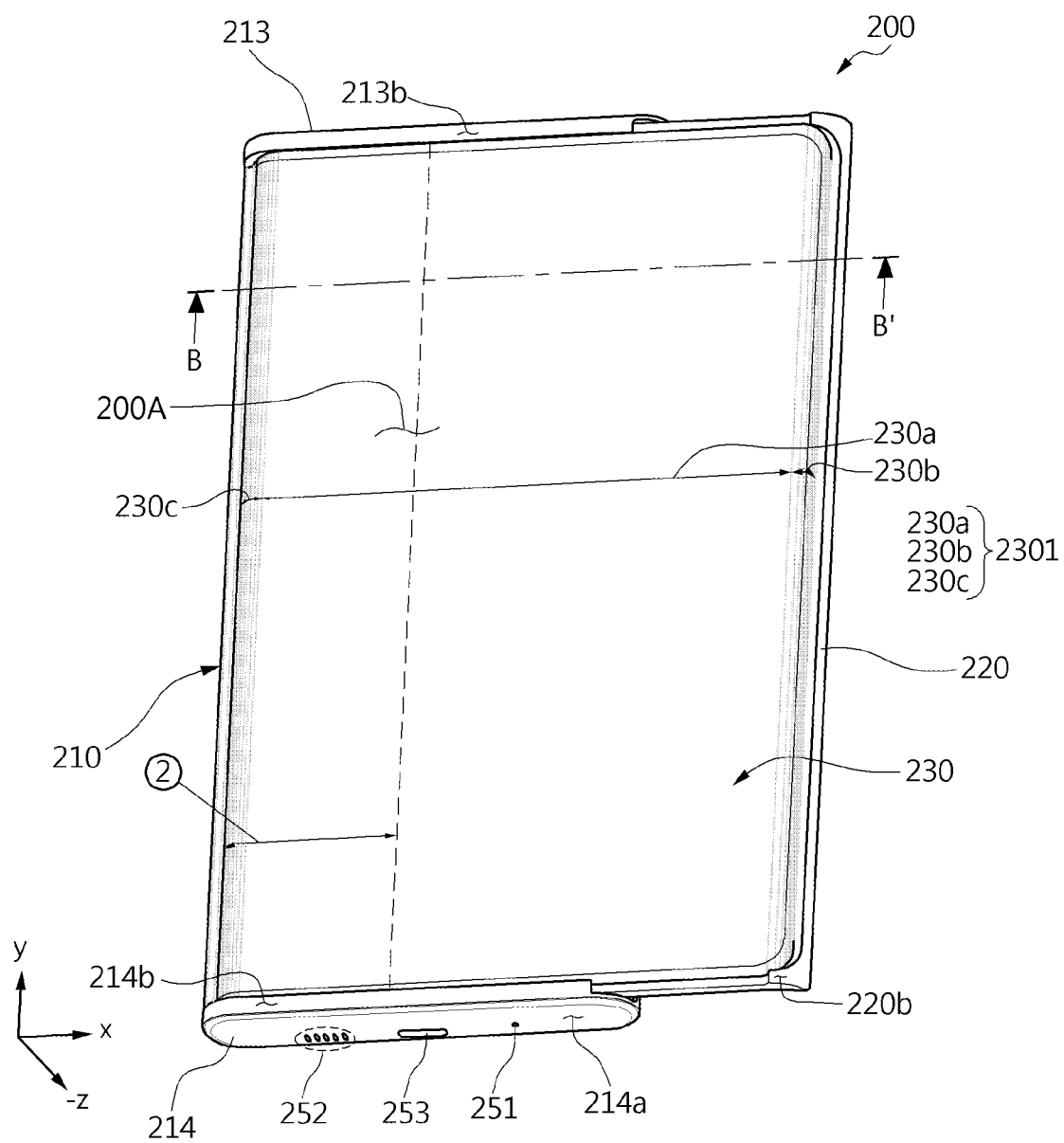
FIG. 3A is a front perspective view of the electronic device in an open state according to various embodiments.
Figure 3B:
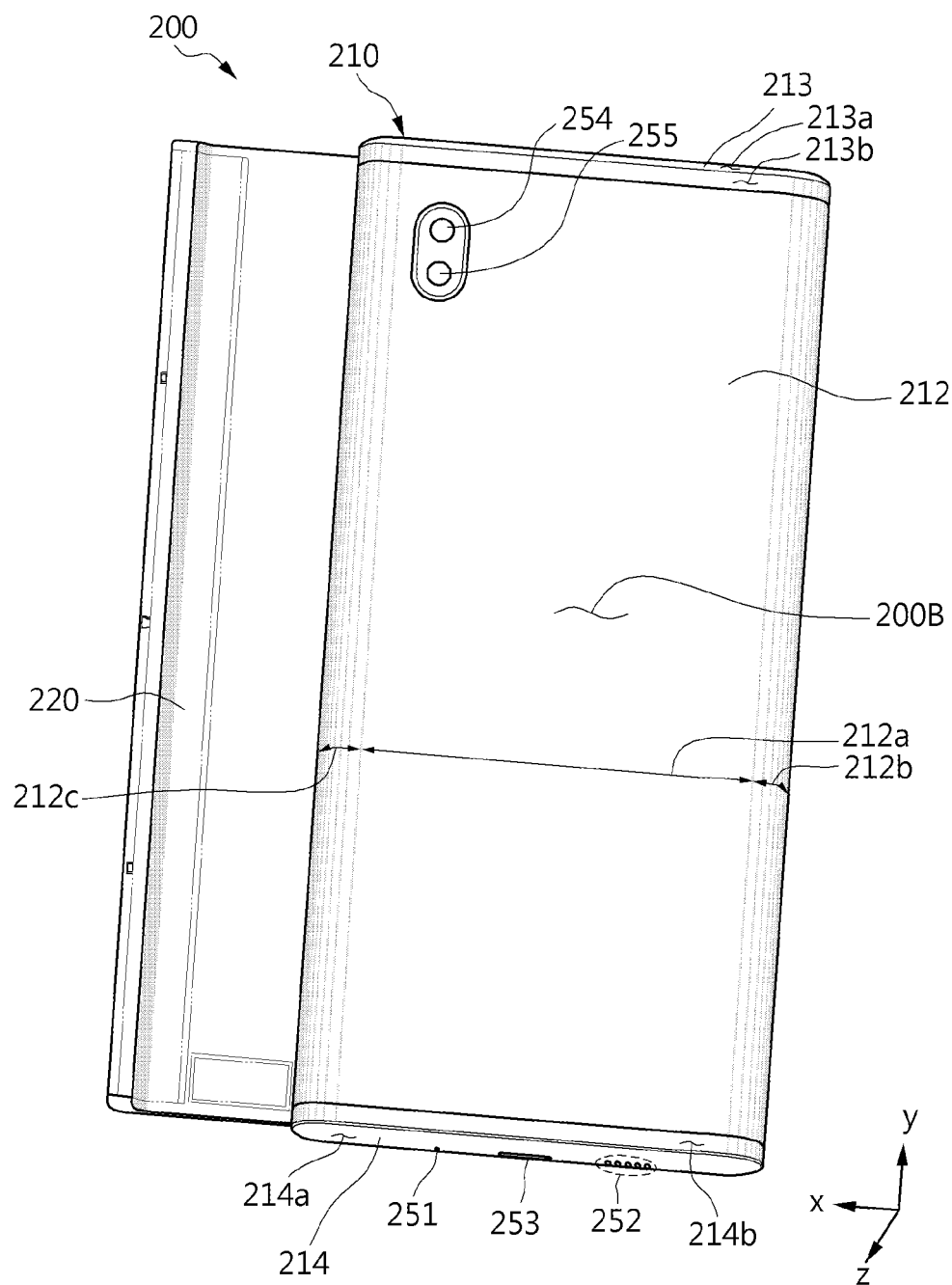
FIG. 3B is a rear perspective view of the electronic device in an open state according to various embodiments.

FIG. 2A is a front perspective view of an electronic device 200 in a closed state according to various embodiments. FIG. 2B is a rear perspective view of the electronic device 200 in a closed state according to various embodiments. FIG. 3A is a front perspective view of the electronic device 200 in an open state according to various embodiments. FIG. 3B is a rear perspective view of the electronic device 200 in an open state according to various embodiments. According to an embodiment, the electronic device 200 of FIG. 2A may include the electronic device 101 of FIG. 1. According to an embodiment, FIGS. 2A and 2B illustrate the electronic device 200 in a state where a screen 2301 is not expanded. According to an embodiment, FIGS. 3A and 3B illustrate the electronic device 200 in a state where the screen 2301 is expanded.

Referring to FIGS. 2A, 2B, 3A, and 3B, according to various embodiments, the electronic device 200 may be implemented to be able to expand the screen 2301 in a sliding manner. According to an embodiment, the screen 2301 may include an area of a flexible display 230 which is visible to the outside. According to an embodiment, a state where the screen 2301 is not expanded is a state where a sliding plate 220 for a sliding motion of the display 230 is not slid out, and may hereinafter be referred to as a "closed state". According to an embodiment, a state where the screen 2301 is expanded is a fully expanded state where the screen 2301 is no longer expanded by sliding-out of the sliding plate 220, and may hereinafter be referred to as an "open state". For example, the sliding-out may include a series of operations in which the sliding plate 220 moves at least partially in a first direction (e.g., the +x-axis direction) when the electronic device 200 switches from the closed state into the open state. For example, the open state may be defined as a state where the screen 2301 is expanded compared to the closed state, and screens of various sizes may be provided according to a moving location of the sliding plate 220. For example, an intermediated state may include a state between the closed state of FIG. 2A and the open state of FIG. 3A. According to an embodiment, the screen 2301 may include an active area (e.g., a display area) of the flexible display 230 which is visually exposed (e.g., visible) and enables output of an image. As used herein with reference to the expandable display, the terms "visually exposed", "exposed" and "visible" may be used interchangeably and are intended to refer to the portions of the display that are visible based on the state of the expandable display. For example, the active area of the display 230 may be adjusted based on movement of the sliding plate 220 or movement of the flexible display 230. According to various embodiments, the flexible display 230, which is disposed in the electronic device 200 of FIG. 2A to be slidable and provides the screen 2301, may also be referred to as a "slide-out display" or an "expandable display".

According to various embodiments, the electronic device 200 may include a sliding structure related to the flexible display 230. According to an embodiment, when the flexible display 230 is moved by a predetermined distance by an external force, the electronic device 200 may switch from the closed state to the open state or from the open state to the closed state without an additional external force, due to an elastic structure included in the sliding structure (e.g., a semi-automatic slide motion).

According to various embodiments, the electronic device 200 may switch from the closed state to the open state or from the open state to the closed state due to a driving device such as a motor connected to the flexible display 230, based on a signal received through an input device included in the electronic device 200. According to an embodiment, the electronic device 200 may switch from the closed state to the open state or from the open state to the closed state when an input signal is detected by a hardware button or a software button provided through a screen.

According to various embodiments, the electronic device 200 may switch from the closed state to the open state or from the open state to the closed state, based on a signal detected through various sensors such as a pressure sensor. According to an embodiment, through at least one sensor, the electronic device 200 may detect a squeeze gesture generated by pressing a designated section of the electronic device 200 by a part (e.g., the palm of a hand or a finger) of a hand when a user grips the electronic device 200 by hand. The electronic device 200 may switch from the closed state to the open state or from the open state to the closed state, based on the squeeze gesture acquired through the at least one sensor.

According to various embodiments, the flexible display 230 may include a second section (see FIG. 3A). According to an embodiment, the second section may include a part of the screen 2301 which is expanded when the electronic device 200 switches from the closed state to the open state. For example, when the electronic device 200 switches from the closed state to the open state, the second section may be slidingly withdrawn from an inner space of the electronic device 200. Accordingly, the screen 2301 may be expanded. According to an embodiment, when the electronic device 200 switches from the open state to the closed state, at least a part of the second section may be slidingly inserted into the inner space of the electronic device 200. Accordingly, the screen 2301 may be reduced.

According to an embodiment, when the electronic device 200 switches from the open state to the closed state, at least a part of the second section may be moved to the inner space of the electronic device 200 while being bent. For example, the flexible display 230 may include a flexible substrate (e.g., a plastic substrate) formed of a polymer material including polyimide (PI) or polyester (PET). For example, the second section is a part of the flexible display 230 which is bent when the electronic device 200 switches between the open state and the closed state, and may be referred to as a bendable section.

According to various embodiments, the electronic device 200 may include a housing 210, the sliding plate 220, or the flexible display 230.

According to an embodiment, the housing (or case) 210 may include a back cover 212, a first side cover 213, or a second side cover 214. The back cover 212, the first side cover 213, or the second side cover 214 may be connected to a support member (not shown) located inside the electronic device 200, and form at least a part of the exterior of the electronic device 200.

According to an embodiment, the back cover 212 may form at least a part of a back surface 200B of the electronic device 200. For example, the back cover 212 may be substantially opaque. For example, the back cover 212 may be formed of coated or colored glass, ceramic, a polymer, a metal (e.g., aluminum, stainless steel (STS), or magnesium), or a combination of at least two of the above materials. According to an embodiment, at least a part of the second section may be disposed to be visible from the outside through the back cover 212 in a state where the second section of the flexible display 230 is inserted into an inner space of the housing 210 (e.g., a closed state). In this case, the back cover 212 may be formed of a transparent material and/or a translucent material.

According to an embodiment, the back cover 212 may include a flat portion 212*a* and curved portions 212*b* and 212*c* located on the opposite sides of the flat portion 212*a* interposed therebetween. For example, the curved portions 212*b* and 212*c* may be disposed adjacent to both relatively long edges (not shown) of the back cover 212, respectively, and may be seamlessly extended by being bent toward a screen located on the opposite side of the back cover 212. According to an embodiment, the back cover 212 may include one of the curved portions 212*b* and 212*c* or may be implemented without the curved portions 212*b* and 212*c*.

According to an embodiment, the first side cover 213 and the second side cover 214 may be located on the opposite sides to each other. For example, the first side cover 213 and the second side cover 214 may be located on the opposite sides of the flexible display 230 interposed therebetween in a second direction (e.g., the y-axis direction) orthogonal to a first direction (e.g., the +x-axis direction) of sliding-out of the sliding plate 220. For example, the first side cover 213 may configure at least a part of a first side surface 213*a* of the electronic device 200. For example, the second side cover 214 may configure at least a part of a second side surface 214*a* of the electronic device 200 facing in an opposite direction to the first side surface 213*a*. For example, the first side cover 213 may include a first edge portion (or a first rim) 213*b* extending from the edge of the first side surface 213*a*. For example, the first edge portion 213*b* may configure at least a part of a bezel on one side of the electronic device 200. For example, the second side cover 214 may include a second edge portion (or a second rim) 214*b* extending from the edge of the second side surface 214*a*. For example, the second edge portion 214*b* may configure at least a part of a bezel on the other side of the electronic device 200.

According to various embodiments, the surface of the first edge portion 213*b*, the surface of the second edge portion 214*b*, and the surface of the sliding plate 220 may be smoothly connected in the closed state of FIG. 2A, and form a one-side curved portion (not shown) corresponding to the side of a first curved portion 230*b* of the screen 2301. According to an embodiment, the surface of the first edge portion 213*b* or the surface of the second edge portion 214*b* may include the other-side curved portion (not shown) corresponding to the side of a second curved portion 230*c* of the screen 2301 located on the opposite side of the first curved portion 230*b*.

According to various embodiments, the sliding plate 220 may perform a sliding movement on a support member (not shown) located inside the electronic device 200. According to an embodiment, at least a part of the flexible display 230 may be disposed on the sliding plate 220. For example, the closed state of FIG. 2A or the open state of FIG. 3A may be configured based on the location of the sliding plate 220 on the support member located inside the electronic device 200. According to an embodiment, the flexible display 230 may be attached to the sliding plate 120 through an adhesive member (or adhesion member) (not shown). For example, the adhesive member may include a heat-reactive adhesive member, a photo-reactive adhesive member, a general adhesive, and/or a double-sided tape. According to an embodiment, the flexible display 230 may be inserted into a recess formed in the sliding plate 220 in a sliding manner, and thus disposed and fixed to the sliding plate 220. For example, the sliding plate 230 may serve to support at least a part of the flexible display 230. For example, the sliding plate 230 may be referred to as a display support structure.

According to various embodiments, the sliding plate 220 may include a third edge portion 220*b* forming an outer surface (e.g., a surface exposed to the outside to form the exterior of the electronic device 200) of the electronic device 200. According to an embodiment, the third edge portion 220*b* may configure a bezel around the screen 2301 together with the first edge portion 213*b* and the second edge portion 214*b* in the closed state of FIG. 2A. According to an embodiment, the third edge portion 220*b* may extend in the second direction (e.g., the y-axis direction) to connect one end portion of the first side cover 213 and one end portion of the second side cover 214 in the closed state of FIG. 2A. For example, the surface of the third edge portion 220*b* may be smoothly connected to the surface of the first edge portion 213*b* and/or the surface of the second edge portion 214*b* in the closed state of FIG. 2A.

According to various embodiments, at least a part of the second section may be withdrawn from the inside of the electronic device 200 due to sliding-out of the sliding plate 220, and thus an expanded state (e.g., an open state) of the screen 2301 as shown in FIG. 3A may be provided.

According to various embodiments, the screen 2301 may include, in the closed state of FIG. 2A, a flat portion 230*a*, and the first curved portion 230*b* and/or the second curved portion 230*c* located on the opposite sides of the flat portion 230*a* interposed therebetween. According to an embodiment, the first curved portion 230*b* and the second curved portion 230c may be substantially symmetrical to each other with the flat portion 230a interposed therebetween. For example, the first curved portion 230b and/or the second curved portion 230c may be located to correspond to the curved portions 212b and 212c of the back cover 212, respectively, in the closed state of FIG. 2A, and may have a curved shape toward the back cover 212. For example, in the case of switching from the closed state of FIG. 2A to the open state of FIG. 3A, the flat portion 230a may be expanded. For example, in the closed state of FIG. 2A, a partial area of the second section forming the second curved portion 230c may be included in the flat portion 230a expanded at the time of switching from the closed state of FIG. 2A to the open state of FIG. 3A, and may be formed as another area of the second section.

According to various embodiments, the electronic device 200 may include an opening (not shown) for drawing-in or drawing-out of the second section, and/or a pulley (not shown) located in the opening. According to an embodiment, the pulley may be located to correspond to the second section, and the movement of the second section and its movement direction may be guided through rotation of the pulley in switching between the closed state of FIG. 2A and the open state of FIG. 3A. According to an embodiment, the first curved portion 230b may be configured to correspond to a curved surface formed on one surface of the sliding plate 220. According to an embodiment, the second curved portion 230c may be configured by a part corresponding to a curved surface of the pulley in the second section. For example, the first curved portion 230c may be located on the opposite side of the second curved portion 230b in the closed state or the open state of the electronic device 200 to improve the aesthetic impression of the screen 2301. According to an embodiment, the electronic device 200 may be implemented in a form in which the flat portion 230a is expanded without the first curved portion 230b.

According to various embodiments, the flexible display 230 may further include a touch detection circuit (e.g., a touch sensor). According to an embodiment (not shown), the flexible display 230 may be coupled to or disposed adjacent to a pressure sensor capable of measuring the intensity (pressure) of a touch, and/or a digitizer which detects a magnetic field-type pen input device (e.g., a stylus pen). For example, the digitizer may include a coil member disposed on a dielectric substrate to detect a resonance frequency of an electromagnetic induction scheme applied from the pen input device.

According to various embodiments, the electronic device 200 may include a microphone hole 251 (e.g., the input module 150 of FIG. 1), a speaker hole 252 (e.g., the sound output module 155 of FIG. 1), a connector hole 253 (e.g., the connection terminal 178 of FIG. 1), a camera module 254 (e.g., the camera module 180 of FIG. 1), or a flash 255. According to an embodiment, the flash 255 may be implemented to be included in the camera module 254. In various embodiments, the electronic device 200 may omit at least one of the components or additionally include other components.

According to an embodiment, the microphone hole 251 may be disposed on at least a part of the second side surface 214a to correspond to a microphone (not shown) located inside the electronic device 200. For example, the location of the microphone hole 251 is not limited to the embodiment of FIG. 2A and may vary. According to an embodiment, the electronic device 200 may include a plurality of microphones capable of detecting a direction of sound.

According to an embodiment, the speaker hole 252 may be disposed on at least a part of the second side surface 214a to correspond to a speaker located inside the electronic device 200. For example, the location of the speaker hole 252 is not limited to the embodiment of FIG. 2A and may vary. According to an embodiment, the electronic device 200 may include a receiver hole for call. In an embodiment, the microphone hole 251 and the speaker hole 252 may be implemented as one hole, or the speaker hole 252 may be omitted like a piezo speaker.

According to an embodiment, the connector hole 253 may be disposed on at least a part of the second side surface 214a to correspond to a connector (e.g., a USB connector) located inside the electronic device 200. For example, the electronic device 200 may transmit and/or receive power and/or data to and/or from an external electronic device electrically connected to the connector through the connector hole 253. For example, the location of the connector hole 253 is not limited to the embodiment of FIG. 2A and may vary.

According to an embodiment, the camera module 254 and the flash 255 may be located on the back surface 200B of the electronic device 200. For example, the camera module 154 may include one or more lenses, an image sensor, and/or an image signal processor. For example, the flash 255 may include a light-emitting diode or a xenon lamp. According to an embodiment, two or more lenses (an infrared camera, and wide-angle and telephoto lenses) and image sensors may be located on one surface of the electronic device 200. According to an embodiment, the electronic device 200 is not limited to the embodiment of FIG. 2B or 3B and may include multiple camera modules. For example, the camera module 254 may be one of the multiple camera modules. For example, the electronic device 200 may include multiple camera modules (e.g., a dual camera or a triple camera) each having a different attribute (e.g., an angle of view) or function. For example, the electronic device 200 may include multiple camera modules (e.g., the camera module 254) including lenses having different angles of view. In this case, the electronic device 200 may control a change of an angle of view of a camera module performed in the electronic device 200, based on a user's selection. In addition, the multiple camera modules may include at least one of a wide-angle camera, a telephoto camera, a color camera, a monochrome camera, or an infrared (IR) camera (e.g., a time of flight (TOF) camera or a structured light camera). According to an embodiment, the IR camera may operate as at least a part of a sensor module (not shown).

According to various embodiments (not shown), the electronic device 200 may include a camera module (e.g., a front camera) which generates an image signal, based on light received through one surface (e.g., a front surface 200A) of the electronic device 200 placed in a direction in which the screen 2301 faces. According to an embodiment, the camera module 254 is not limited to the embodiment of FIG. 2B or 3B, and may be located inside the housing 210 while being aligned with an opening (e.g., a through hole or a notch) formed in the flexible display 230. For example, the camera module 254 may generate an image signal by receiving light through the opening formed in the flexible display 230 and a partial area of a transparent cover overlapping the opening formed in the flexible display 230. For example, the transparent cover may serve to protect the flexible display 230 from the outside, and include a material such as polyimide or ultra-thin glass (UTG).

According to an embodiment, the camera module 254 may be disposed at a lower end of at least a part of the screen 2301 of the flexible display 230, and perform a related function (e.g., image capturing) without visually distinguishing (or exposing) the location of the camera module 254. In this case, the camera module 254 may be disposed to overlap at least a part of the screen 2301 when viewed from the above (e.g., when viewed in the −z axis direction) of the screen 2301, and thus obtain an image of an external subject without being exposed to the outside.

According to various embodiments (not shown), the electronic device 200 may further include a key input device (e.g., the input module 150 of FIG. 1). According to an embodiment, the key input device may be located on the first side surface 213*a* of the electronic device 200, which is configured by the first side cover 213. According to an embodiment (not shown), the key input device may include at least one sensor module.

According to various embodiments (not shown), the electronic device 200 may include various sensor modules (e.g., the sensor module 176 of FIG. 1). According to an embodiment, the sensor module may generate an electrical signal or a data value corresponding to an internal operating state of the electronic device 200 or an external environment state. For example (not shown), the sensor module may include a proximity sensor which generates a signal related to the proximity of an external object, based on light received through the front surface 200A of the electronic device 200 placed in a direction in which the screen 2301 faces. For another example (not shown), the sensor module may include various biometric sensors, such as a fingerprint sensor or an HRM sensor, which detect biometric information, based on light received through the front surface 200A or the back surface 200B of the electronic device 200. For example, the electronic device 200 may include, as various other sensor modules, at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

According to various embodiments, the electronic device 200 is not limited to the embodiments of FIGS. 2A, 2B, 3A, and 3C, and may be implemented to have a structure in which the screen is extended from the third edge portion 220*b* when the sliding plate 220 slides out. For example, a partial area of the flexible display 230 forming the first curved portion 230*b* in the closed state of FIG. 2A may be included in the flat portion 230*a* expanded when switching from the closed state of FIG. 2A to the open state of FIG. 3A, and may be formed as another area of the flexible display 230.

Figure 4:
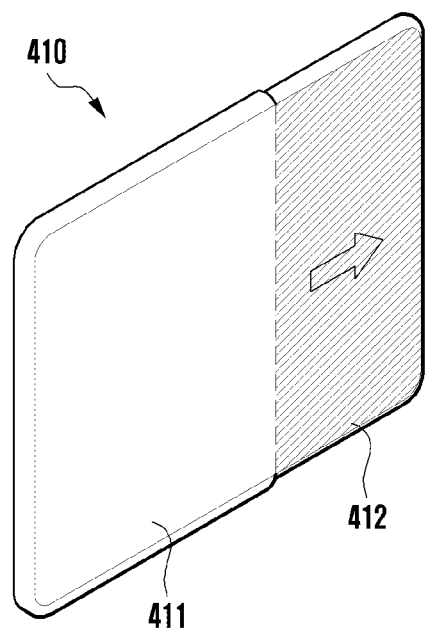
FIG. 4 is a perspective view illustrating a structure of an expandable display of an electronic device according to various embodiments.
Figure 4:
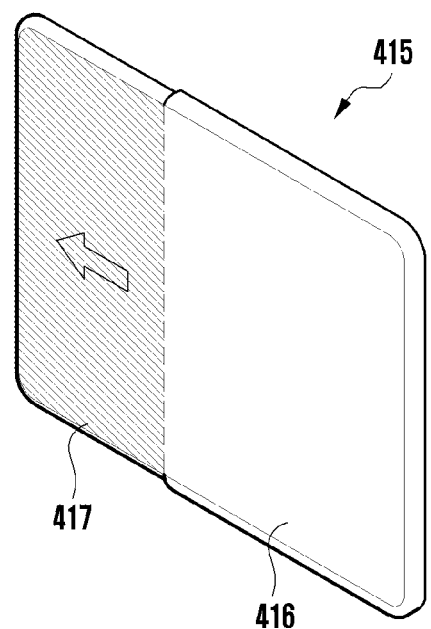

FIG. 4 is a perspective view illustrating a structure of an expandable display of an electronic device according to various embodiments.

According to various embodiments, an electronic device may include a display having a substantially rectangular shape, and the display may extend in at least one direction among up, down, left, and right directions (e.g., the flexible display of FIGS. 2A to 3B). For example, in a state where the display is not expanded, a partial area may be received within a housing through a rolling structure, and the partial area having been received by rotation of the rolling structure by a user's manipulation or a motor may be slid and exposed to the outside.

According to various embodiments, the electronic device may include a display which is expandable in a left or right direction. Referring to FIG. 4, the electronic device may include a display 410 which is expandable to the left. For example, the electronic device may display a screen through a main display area 411 in a state where the display 410 is not expanded, and an expandable display area 412 may be received in the housing and be in an inactive state. When the expandable display area 412 is withdrawn to the left by a user's manipulation and thus exposed to the outside, the expandable display area 412 is activated, so that a screen may be displayed on the main display area 411 and the expandable display area 412.

According to an embodiment, the display 415 of the electronic device may include a main display area 416 which displays a screen in an unexpanded state, and an expandable display area 417 which is expandable to the right and displays a screen in an expanded state.

Figure 5:
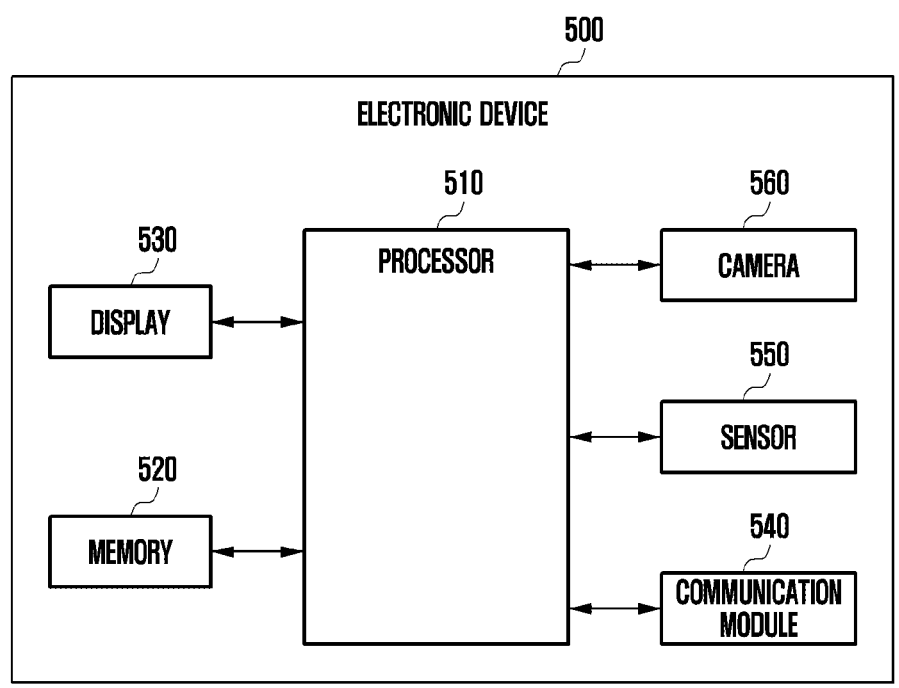
FIG. 5 is a block diagram illustrating an example configuration of an electronic device according to various embodiments.

FIG. 5 is a block diagram illustrating an example configuration of an electronic device according to various embodiments.

Referring to FIG. 5, an electronic device 500 may include a processor (e.g., including processing circuitry) 510, a memory 520, a display 530, a communication module (e.g., including communication circuitry) 540, a sensor 550, and a camera 560, and even when at least some of the illustrated configurations are omitted and/or substituted, various embodiments of this disclosure may be implemented. The electronic device 500 may further include at least a part of the configuration and/or functions of the electronic device 101 of FIG. 1.

Some configurations (e.g., the processor 510, the memory 520, and the communication module 540) of the configurations shown in FIG. 5 and/or other configurations of the electronic device 500 not shown may be disposed inside a housing (not shown) of the electronic device 500, and at least a part of some configurations (e.g., the display 530) may be exposed to the outside of the housing.

According to various embodiments, the display 530 may display a content provided from the processor 510. For example, the display 530 may display a main content (or a first content) generated by an application executed through the processor 510 and/or a background screen (or a second content) obtained from an external device through the communication module 540.

According to various embodiments, the memory 520 may store in advance a background screen to be displayed in an area other than an area where the main content is displayed in the expanded/reduced area of the display 530. According to a user's touch input and location, displaying and expanding/reducing of the background screen may be required, and in this case, using the background screen stored in the memory 520 may reduce loading time and thus provide a smooth screen to the user in real time. An embodiment utilizing the background screen will be described in greater detail below with reference to FIGS. 9, 10, 11, 14, and 15.

According to various embodiments, the display 530 may include a main display area (e.g., the main display area 411 of FIG. 4) and at least one expandable display area (e.g., the expandable display area 412 of FIG. 4). The display 530 may include at least one expandable display area which is expandable from the main display area in at least one direction among up, down, left, and right directions. For example, in a state where the display 530 is inserted, only the main display area is exposed to the outside to output a screen, and the expandable display area received inside the housing and thus not exposed to the outside may not output a screen in an inactive state. When the display 530 is withdrawn, at least a part of the expandable display area is exposed to the outside, and as such, a screen may be output by switching the expandable display area into an active state. Various forms of the expandable display 530 have been previously described with reference to FIGS. 2A and 2B, and 3A and 3B, but are not limited thereto.

According to various embodiments, the electronic device 500 may have a form entirely wound without a folding shaft. The display 530 may be disposed on a front surface of the electronic device 500, and the display 530 may be a rollable display. In a state where the electronic device 500 is fully unfolded, an execution screen of an application may be displayed on the entire of the electronic device 500.

According to various embodiments, the display 530 may be configured as a touch screen which detects a touch and/or proximity touch (or hovering) input using a part (e.g., a finger) of a user's body or an input device (e.g., a stylus pen).

According to various embodiments, the electronic device 500 may include at least one sensor 550 which detects contact or proximity. For example, the electronic device 500 may include various types of near field sensors which detect proximity or contact of an object, such as near field communication (NFC), radio frequency identification (RFID), Bluetooth (or Bluetooth low energy), or a touch sensor.

According to various embodiments, the at least one sensor 550 may be disposed in an upper, lower, left, and right bezel area of the display 530, respectively, and/or a corner area of the housing. Accordingly, at the time of selecting an area to display the main content or the background screen, a touch or proximity input may be made to the sensor 550 adjacent to an area intended by a user. In various embodiments, the electronic device 500 may have one to five sensors 550 disposed at locations around the display 530.

According to various embodiments, the camera 560 may be disposed in a bezel area around the display 530 or a notch area inside the display 530 to capture a surrounding subject. Image data captured by the camera 560 may be provided to the processor 510, and the processor 510 may analyze a corresponding image to determine a user's interaction location.

According to various embodiments, the communication module 540 may include various communication circuitry and provide a wired or wireless communication interface with an external device. For example, the communication module 540 may include a high definition multimedia interface (HDMI) and a universal serial bus (USB) interface as an example of the wired communication interface (e.g., the interface 177 of FIG. 1). In addition, the communication module 540 may include a wireless communication module (e.g., the wireless communication module 192 of FIG. 1) which supports a short-range communication module with an external device. The wireless communication module may support various short-distance wireless communication schemes (e.g., Wi-Fi, Bluetooth, and Bluetooth low energy (BLE)), and may include an independent hardware and/or software configuration for supporting each wireless communication scheme.

According to various embodiments, the memory 520 may include a volatile memory and a non-volatile memory, and temporarily or permanently store various data. The memory 520 may include at least a part of the configuration and/or functions of the memory 130 of FIG. 1, and may store the program 140 of FIG. 1.

The memory 520 may store various instructions which may be executed by the processor 510. Such instructions may include control commands, such as arithmetic and logical operations, data movement, and input/output, which may be recognized by the processor 510.

According to various embodiments, the processor 510 is a configuration including various processing circuitry capable of performing an operation or data processing relating to control and/or communication of each component of the electronic device 500, and one or more processors 510 may be configured. The processor 510 may include at least a part of the configuration and/or functions of the processor 120 of FIG. 1. The processor 510 may be operatively, functionally, and/or electrically connected with each component of the electronic device 500, such as the display 530, the memory 520, the sensor 550, and the camera 560.

According to various embodiments, operation and data processing functions which may be implemented on the electronic device 500 by the processor 510 are not limited. However, hereinafter, various embodiments for determining an area to display a main content and a background screen on the display 530, and expanding the display 530 accordingly will be described. The operations of the processor 510 to be described later may be performed by loading the instructions stored in the memory 520.

According to various embodiments, the processor 510 may display (e.g., control the display to display) a main content (or a first content) on the main display area in a state where the display 530 is not expanded. The main content may be a content generated by executing an application (e.g., an Internet browser, a game, or a gallery) by the electronic device 500. In a state where the display 530 is not expanded, the expandable display area is inserted into the housing, and the processor 510 may control the expandable display area to be in an inactive state.

According to various embodiments, when the expandable display area is expanded, the processor 510 may determine the main display area as a first area to display the main content, and determine the expandable display area as a second area to display the background screen. In this case, the main content may be continuously displayed on the same location before and after the expansion of the display 530, and the background screen may be displayed on the expandable display area which is expanded to one of upper, lower, left, and right sides.

According to various embodiments, the processor 510 may determine the first area to display the main content and the second area to display the background screen, based on a user interaction.

According to an embodiment, the processor 510 may determine the first area and the second area, based on a touch or proximity input on the sensor 550 disposed at the periphery (e.g., a corner of the housing or a bezel area) of the display 530. For example, the electronic device 500 may include four sensors 550 (e.g., a grip sensor or a strain gauge sensor) on the upper, lower, left, and right sides of the display 530, and when a user's proximity is detected by a specific sensor 550 (e.g., a grip sensor or a strain gauge sensor), the electronic device may determine that the background screen is displayed in an area corresponding to the location of the corresponding sensor 550 on the expanded display 530.

According to an embodiment, the processor 510 may determine the first area and the second area, based on a touch input on the main display area. The display 530 may be configured by a touch screen, and the processor 510 divides the main display area of the display 530 into multiple areas, and when a user's touch input is detected in one of the divided areas, the processor may determine to display the main content or the background screen in an area which is expanded.

According to various embodiments, when the first area to display the main content and the second area to display the background screen are determined, the processor 510 may control the expandable display area of the display 530 to be expanded. For example, the display 530 may be configured such that at least one expandable display area is expanded by a motor structure. In this case, the processor 510 may automatically expand the expandable display area to correspond to the size of an area to display the main content and the background screen. Alternatively, the display 530 may be configured to be manually expanded by a user's force, and the processor 510 may provide information which guides a user to expand the expandable display area on the main display area.

According to various embodiments, the processor 510 may determine a screen display format for displaying the main content and the background screen on the expanded display 530. For example, the processor 510 may add a display area of the background screen on the expanded display 530 while maintaining a display area of the main content, or expand and display the size of the main content to correspond to an area of the expanded display 530.

According to various embodiments, when the first area to display the main content and the second area to display the background screen are determined, the processor 510 may adjust the size of the main content and/or the background screen. For example, when the processor 510 cannot display the first content in the same size as before even on the expanded display 530 as the second content is additionally displayed, the processor may reduce the main content while maintaining an aspect ratio of the main content. Alternatively, the processor 510 may display only a part of the main content by cutting out a part of the top and bottom or the left and right of the main content, or change the aspect ratio (or resolution) of the main content to be suitable for the size of the determined first area.

According to various embodiments, as an area where an application is to be displayed is changed, the processor 510 may generate an application screen, based on attributes (e.g., a size, a ratio, a resolution, etc.) of the changed area. The processor 510 may provide, to an application being executed, a sliding event and attribute information of an area where the application is to be displayed after sliding. For example, the electronic device 500 may generate an application screen, based on attributes (e.g., a size, a ratio, and a resolution) of the expanded display. According to various embodiments, the processor 510 may identify whether an execution screen of an application is resizable. In a case where the application displayed on the display 530 in an unfolded state is an application (e.g., an Internet browser) capable of dynamic resolution change, when a sliding gesture is detected, the processor 120 may cause the resolution of the corresponding application screen to be changed and displayed, based on the attribute of the changed display area together with a snapshot. The corresponding embodiment will be described in detail in FIG. 12.

In a case where the application displayed on the display 530 in an unexpanded state is an application (e.g., a game application) configured to be unable to change a resolution during execution, when a sliding gesture is detected, the processor 510 may show that a user's input has been received through a snapshot, and display a split screen and a background screen to correspond to the display area which is changed. An example corresponding embodiment will be described in greater detail below with reference to FIG. 14 or 15.

According to various embodiments, the electronic device may include a flexible display 530 including a main display area and at least one expandable display area which is expandable from the main display area, and a processor 510 operatively connected to the display 530. When touch input information of an area of the display 530 is received in a state where the expandable display area is not expanded, the processor 510 may slide the display 530 out to expand the display to a second size. While a state of the electronic device 500 is being switched into a slide-out state, the second content may be displayed on the expandable display area or the entire display area, and when the switching of the state of the electronic device 500 into the slide-out state is completed, the displaying of the second content may be terminated and the first content may be displayed on at least a part of the display 530.

Through this process, a user may enjoy the second content instead of a black screen, so that a sense of disconnection in app use that the user can feel may be prevented and/or reduced and a smooth app use experience may be provided. In addition, the processor 510 may delete the second content on the display 530 when an expansion operation of the electronic device is finished, and display the first content originally being executed or a new content through the split screen. The corresponding embodiment will be described in detail in FIGS. 9, 10, and 14 below.

Figure 6:
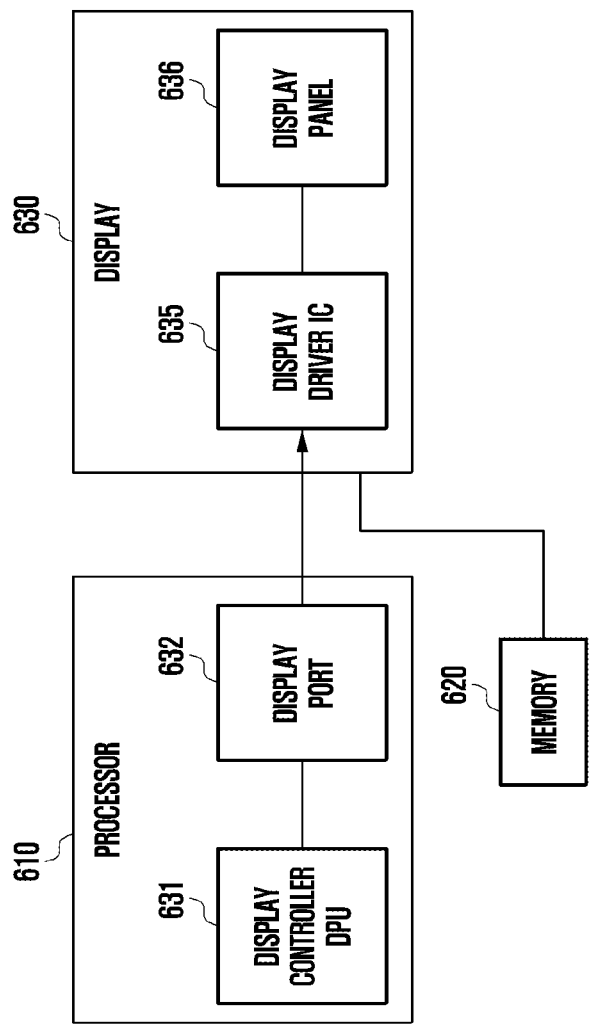
FIG. 6 is a block diagram illustrating an example configuration of an electronic device according to various embodiments.

FIG. 6 is a block diagram illustrating an example configuration of an electronic device according to various embodiments.

It has been described with reference to FIG. 5 above that an electronic device 600 may include a processor (e.g., including processing circuitry) 610, a memory 620, and a display 630. The processor 610 may include a display processor unit (DPU) (e.g., including various processing circuitry and/or executable program instructions) 631 and a display port 632, and the display 630 may include a display driver IC 635 and a display panel 636.

According to various embodiments, the display 630 may include a touch sensor which detects a touch input occurring on the display 630. The touch sensor may provide a touch event corresponding to a touch input to the processor 610. The touch event may include, for example, a press, long press, release, and cancel event.

According to various embodiments, the processor 610 may display an execution screen of an application on the entire area of the display 630 in a state where the electronic device 600 is unfolded. The touch sensor may provide, to the processor 610, a touch event corresponding to a touch input occurring on the entire area of the display 630 in a state where the electronic device 600 is unfolded.

According to various embodiments, the processor 610 may detect a sliding gesture in a state where the electronic device 600 is expanded or reduced. The sliding gesture may refer to an operation of applying a force to the electronic device 600 by a user in a reduced state of the electronic device 600 to unfold a part of the display which has been rolled inside a housing of the electronic device 600 with reference to a bezel area to which the force is applied, or conversely, applying a force to the electronic device 600 by the user to roll a part of the display into the housing in an expanded state of the electronic device 600.

According to various embodiments, the processor 610 may stop transmission of a touch event to the display 630 when a sliding gesture is initiated. This is because a touch on the display 630 during sliding is not intended as a touch input by a user. In addition, when a sliding motion is detected within a predetermined period of time (e.g., 1 sec) after a touch motion event, the processor 510 may stop transmission of the generated touch event. According to an embodiment, when a sliding gesture is initiated, the processor 610 may ignore a received touch event without requesting the touch sensor to stop transmission of the touch event.

That is, even when the touch event is received, the processor may not provide the touch event to the application.

According to various embodiments, the processor 610 may cancel a touch event (e.g., a press, long press, or release event) provided to the application before sliding is initiated. For example, the processor 610 may cancel execution of an operation of an application to be executed in response to the touch event, or cancel execution of an operation of an application already executed in response to the touch event.

According to various embodiments, when sliding is initiated, the processor 610 may provide a cancel event corresponding to a previously provided touch event to the application. For example, a press event is an event actually occurring during sliding, but what is intended by a user for this event is not a touch input but is sliding. Therefore, the processor 610 may provide a cancel event to the application even in the process of receiving the press event from the touch sensor, thereby preventing and/or reducing the application from operating by recognizing a touch for sliding as a touch event. Accordingly, the application may not execute an operation according to a touch event generated by the touch sensor within a predetermined period of time after the electronic device 600 slides.

The processor 610 may discard a touch event which has not been transmitted to the application among touch events which have already generated. For example, the processor 610 may provide, to the application, a cancellation event (A cancel) for a touch event (A press) provided to the application before sliding is initiated. Accordingly, the application may not perform an operation corresponding to a previously received touch event (A press), or may cancel an operation which has already been performed. Alternatively, touch events (B press and C press) occurring while a sliding gesture is performed may not be transmitted to the processor 510.

The touch sensor of the display 630 may provide, to the processor 610, a touch event occurring after a sliding motion. Herein, B release and C release are operations connected to B press and C release from the perspective of a user or the touch sensor, and since B press and C press are made during sliding, touch events of B press and C press may not be transmitted to the processor 510. Accordingly, even when B release and C release touch events are transmitted from the touch sensor thereafter, the processor may ignore the B release and C release touch events and may not perform operations corresponding to the B release and C release. Alternatively, the processor 610 may not provide a B release event and a C release event to the application.

According to an embodiment, the processor 610 may transmit all touch events transmitted from the touch sensor to the application after the size change of the display 630 is completed, and the application may process, as an error, touch events which are received without a press event, such as the B release and C release, and may not reflect the touch events to a state of the application. Thereafter, when new press events, D press and D release, are provided from the touch sensor, the processor 610 may perform operations corresponding to the D press and D release.

Figure 7:
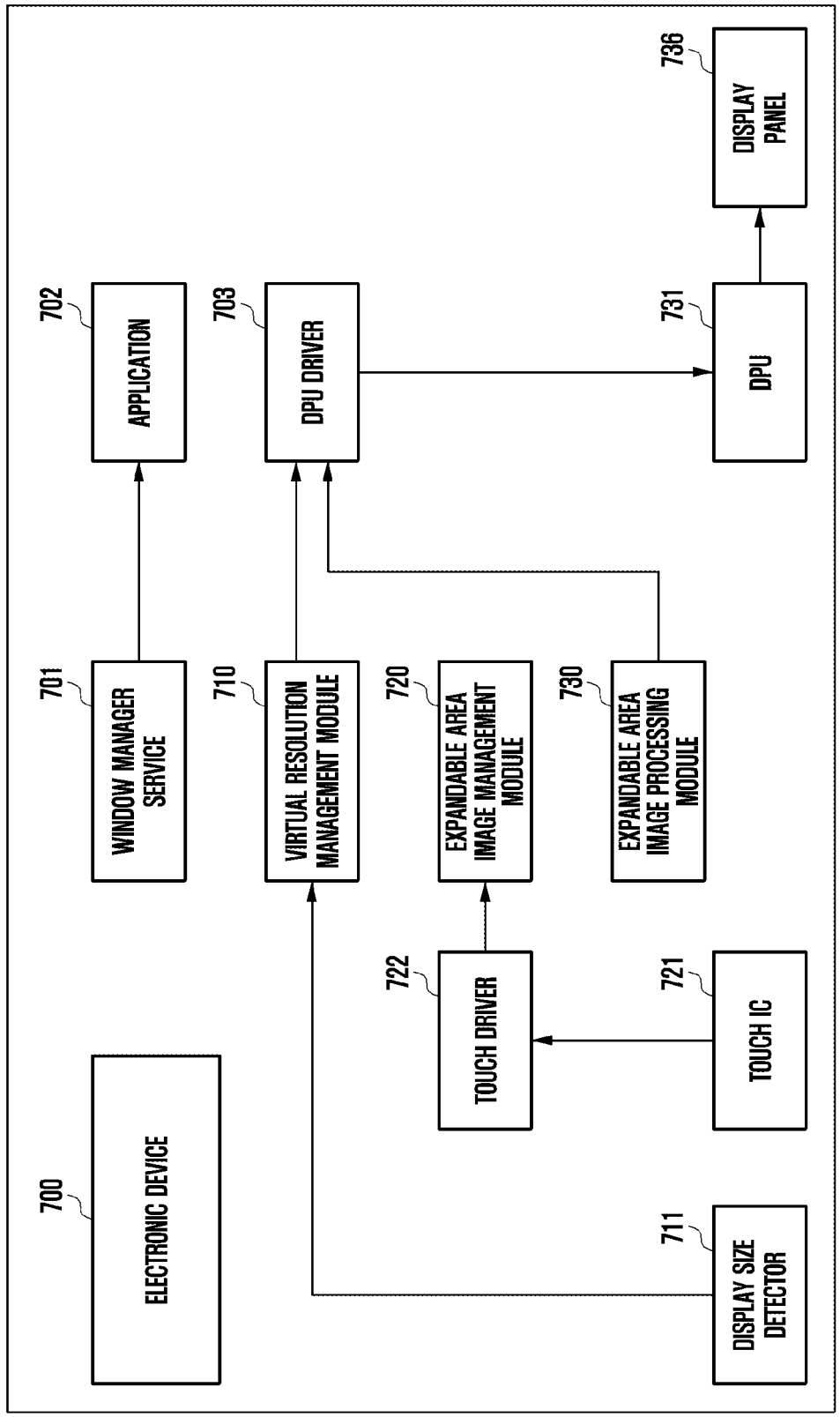
FIG. 7 is a block diagram illustrating an example configuration of an electronic device according to various embodiments.

FIG. 7 is a block diagram illustrating an example configuration of an electronic device according to various embodiments.

An electronic device 700 may include a virtual resolution management module (e.g., including various processing circuitry and/or executable program instructions) 710, an expandable area image management module (e.g., including various processing circuitry and/or executable program instructions) 720, an expandable area image processing module (e.g., including various processing circuitry and/or executable program instructions) 730, a window manager service 701, a DPU driver 703, a DPU 731, a display panel 736, a screen size detector (e.g., including various circuitry and/or executable program instructions) 711, a touch driver 722, and a touch IC.

According to an embodiment, the display size detector 711 may transmit a display size, which is physically changed according to a sliding motion of an area of the display 530, to the virtual resolution management module 710 in real time. The virtual resolution management module 710 may continuously receive information on the display size from the display size detector 711, and distinguish whether the display is in the middle of sliding or whether the sliding is completed and thus the change is over. The virtual resolution management module 710 may transmit resolution change information in real time only to the DPU driver 703 during sliding, that is, while the display area is being changed.

The expandable area image management module 720 may determine an image to be displayed in an expanded area of the display 530. According to an embodiment, an image which may be displayed in the expanded area may be a background screen or a snapshot of an app currently being executed. The expandable area image management module 720 may receive touch information related to whether a user is touching a predetermined part of the display 730, through the touch driver 722. The touch IC 721 may obtain user touch information through a dielectric disposed in a lower area of the display 530. The location of a touch input of the user to the electronic device 700 may be determined by detecting information on contact or proximity of the user in units of coordinates or pixels on the display 530. When the touch IC 721 of the display 530 recognizes the user's touch and transmits related information through the touch driver 722, the expandable area image management module 720 may recognize the related information as an expansion/reduction command of an application 702 currently being executed. In this case, the expandable area image management module 720 may secure a snapshot of the application 702 currently being executed. The snapshot may be obtained by instantaneously capturing an application screen and secured through a GPU, a DPU, or a CPU.

According to an embodiment, a user may hold the inside of the area of the display 530 and expand the area of the display 530 through touching of a sufficient area. Herein, the sufficient area may refer, for example, to the area of the display 530, and the expandable area image management module 720 may be aware of a location and an area of a touch input through the touch IC 721 in the area of the display 530. When a touch input transmitted through the touch IC 721 is located inside the area of the display 530, the expandable area image management module 720 may determine that a user has expanded the display 530 with the intention of touching the area of the display 530. In this case, the previously secured snapshot may be displayed in the expanded area.

According to an embodiment, a user may expand the area of the display 530 by holding a bezel part without touching a sufficient area. As mentioned above, the sufficient area refers to the area of the display 530, and the expandable area image management module 720 may be aware of a location and an area of a touch input through the touch IC 721 in the area of the display 530. When a touch input transmitted through the touch IC 721 is located outside the area of the display 530, the expandable area image management module 720 may determine that a user has expanded the display 530 with the intention of touching a bezel area other than the area of the display 530. In this case, since a background screen is required to be displayed in the area of the display 530 which is expanded, the expandable area image management module 720 may secure a background screen image.

According to an embodiment, an image to be displayed in the expanded area may vary according to a user's configuration. As described above, a snapshot or a background screen may be displayed in the expanded area of the display 530. For example, a user may expand the area of the display 530 while touching an upper end of the display area. In this case, according to the user's configuration, when the upper end is touched, the background screen, not the snapshot, may be configured to be displayed. The upper end may be a section of 50 to 80 when the display area is divided into 0 to 100 with reference to the Y-axis. This may vary according to the user's configuration, and the upper end may not necessarily be fixed to an area of 50-80. The location where a touch input may be configured is also not limited to only the upper end, and any location such as a lower end, middle, left side, and right side can be configured, and according to the user's configuration, an image to be displayed in the expanded area at the time of touching may vary.

According to an embodiment, the application 702 may not allow dynamic resolution change. This will be referred to as "an app which does not allow dynamic resolution change" hereinafter. In relation to the app which does not allow dynamic resolution change (e.g., a game application and a video application), when a horizontal-to-vertical ratio is changed while the app is running, a certain image part may be deleted or an abnormal screen may be output. To prevent and/or reduce the above, the window manager service 701 may manage a resolution and may disallow dynamic resolution change. In the case of the app which does not allow dynamic resolution change, even when a user expands the display 530 while touching the area of the display 530, a background screen, not a snapshot of an app currently being executed, may be displayed on an expanded screen, and when the expansion of the display 530 is finished, a split screen environment may be provided.

According to an embodiment, the expandable area image processing module 730 may receive the determined expanded area image from the expandable area image management module 720 and perform post-processing on the corresponding image. For example, when the expanded area image is a background screen, the expandable area image processing module 730 may enlarge an image of the background screen to be suitable for the maximum size of the expanded area when the resolution of a source image in the background screen is smaller than the size of the expanded area. In addition, when the expanded area image is a snapshot of the application 702, the expandable area image processing module 730 may enlarge or reduce the snapshot in real time according to the size change of the display 530 after transparently processing the snapshot in order to give an effect of increasing the existing application 702.

According to an embodiment, the DPU driver 703 may receive an instruction related to resolution change of the DPU from the virtual resolution management module 710. In addition, information on the post-processed image may be received from the expandable area image processing module 730 and display information on the expanded image may be transmitted to the DPU 731. The DPU 731 may receive the display information on the expanded image from the DPU driver 731 and display the expanded image on the display panel 736 during the change of the display 530. In addition, the DPU 731 may receive an image of the application 702 fixed to the existing resolution from the DPU driver 731.

According to an embodiment, when the change of the area of the display 530 is completed and thus the size change is stopped, the virtual resolution management module 710 may determine the same and transmit a final resolution to the window manager service 701. The window manager service 701 applies the final resolution to the entire graphic system. In the case of the DPU driver 703, since resolution information is received from the virtual resolution management module 710 in real time, the final resolution may have already been applied.

According to an embodiment, the window manager service 701 may request the application 702 being executed to render an image to which the final resolution is applied. The application 702 may receive a request for application of the final resolution from the window manager service 701, render the image to which the final resolution is applied, and transmit the rendered image to the DPU driver 703. In this process, not only a corresponding image but also a related buffer may be transmitted, and it may take 100 to 900 ms, 500 ms on average.

According to an embodiment, the DPU driver 703 may receive a final resolution-applied image and transmit the image to the DPU 731. The DPU 731 may display a related image on the display panel 736 as a final image.

Figure 8:
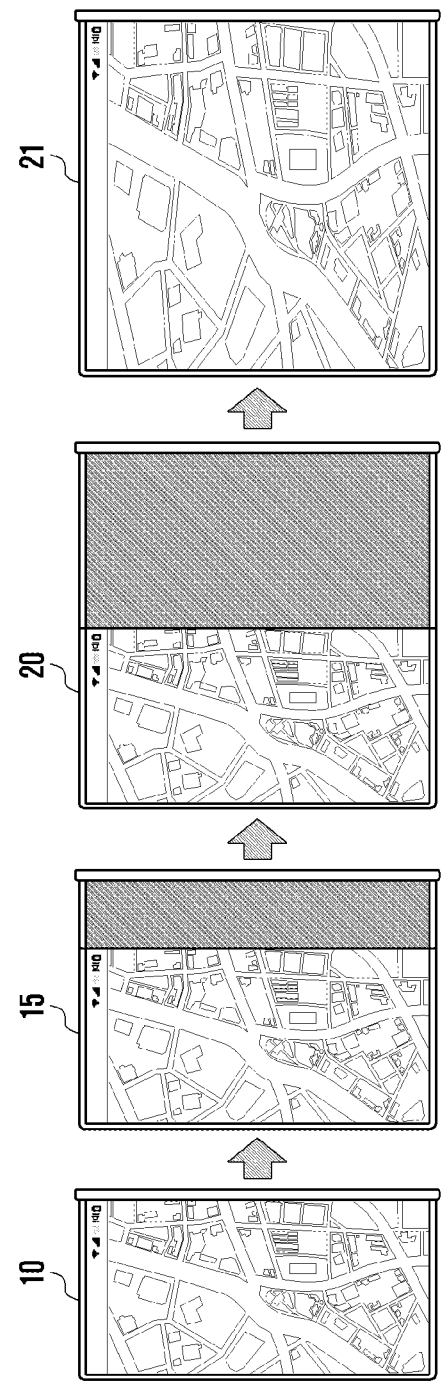
FIG. 8 is a diagram illustrating an expanded state of an electronic device according to various embodiments.

FIG. 8 is a diagram illustrating an expanded state of an electronic device according to various embodiments.

The display of the electronic device 600 may display a main content in an unexpanded state (10). In this case, when a user's touch input is received, the processor 510 may expand the display 530 (15). For example, the display 530 may be configured such that at least one expandable display area is expanded by a motor structure. In this case, the processor 510 may automatically expand the display area while maintaining the main content. Alternatively, the at least one expandable display area may be configured to be manually expanded by a user's force. When the resolution of the main content being executed in the existing display area is changed in real time to correspond to a display area which is expanded, stuttering and large current consumption may occur. For this reason, the display area which is expanded may be displayed as a black screen. The black screen may be maintained until the expansion of the display area is completed (20). After the expansion is completed, the electronic device 600 may change the resolution of the main content to a final resolution and apply the final resolution (21). The black screen disappears after the final resolution is applied, but the existence of the black screen may cause a user to feel disconnected from using an app.

Figure 9:
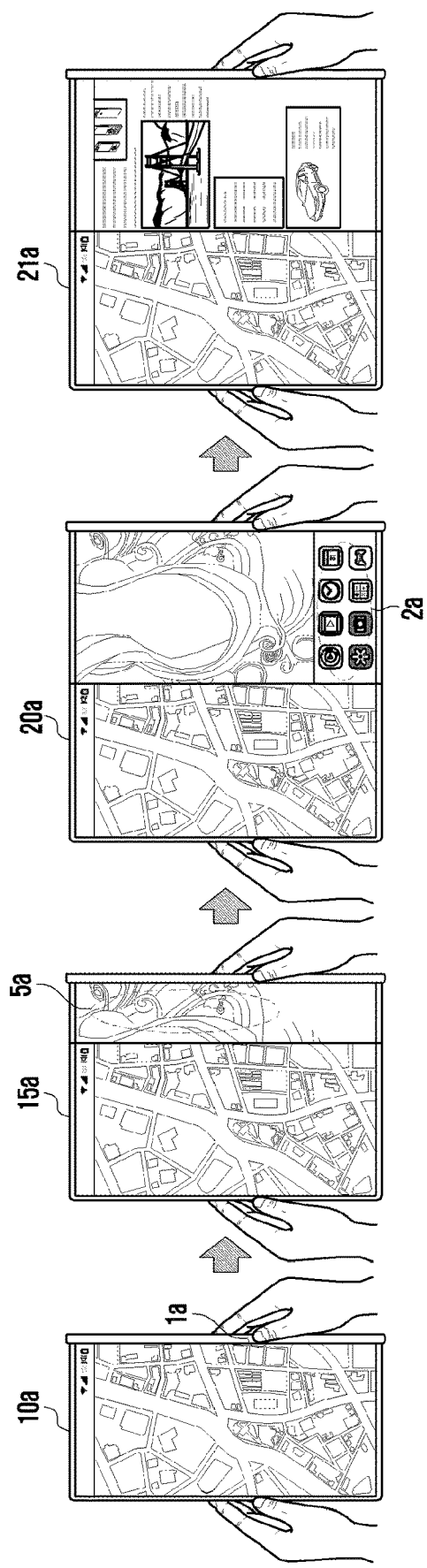
FIG. 9 is a diagram illustrating an expansion process of an electronic device according to various embodiments.

FIG. 9 is a diagram illustrating an expansion process of an electronic device according to various embodiments.

The display of the electronic device 600 may display a main content in an unexpanded state (10*a*). In this case, when a user's touch input is received, the processor 510 may expand the display 530 (15*a*). The user's touch input may be located on a bezel area (1*a*). For example, the display 530 may be configured such that at least one expandable display area is expanded by a motor structure. In this case, the processor 510 may expand the display area while maintaining an area where the main content is displayed, and may expand and display a background screen 5*a* to correspond to the size of an area which is expanded. Alternatively, the display 530 may be configured to be manually expanded by a user's force. The expansion of the background screen may continue until the expansion of the display is completed, and the processor 510 may stop the expansion of the background screen when the expansion of the display is completed, and display an app icon screen 2a on the background screen (20a).

According to various embodiments, while the area of the display 530 is being expanded, the resolution of the main content may be fixed. The resolution of the main content is managed by a window manager service, and the DPU 631 may expand the background screen 5a in real time to correspond to the area of the display 530 which is expanded. The DPU 631 may control a screen displayed on the display panel 636 through the display driver IC 635 via the display port 632. The background screen 5a managed by the DPU 631 may be displayed on the display panel 636 while the area of the display 530 is being expanded.

According to various embodiments, when the change of the area of the display 530 is stopped, the window manager service may update a graphic system by receiving final resolution information of the main content being executed. The processor 510 may display guide information on a split screen to a user while maintaining a main content screen and the app icon screen 2a. According to a user's selection, the processor 510 may execute an app screen selected on the app icon screen 2a while maintaining the split screen 21a.

Figure 10:
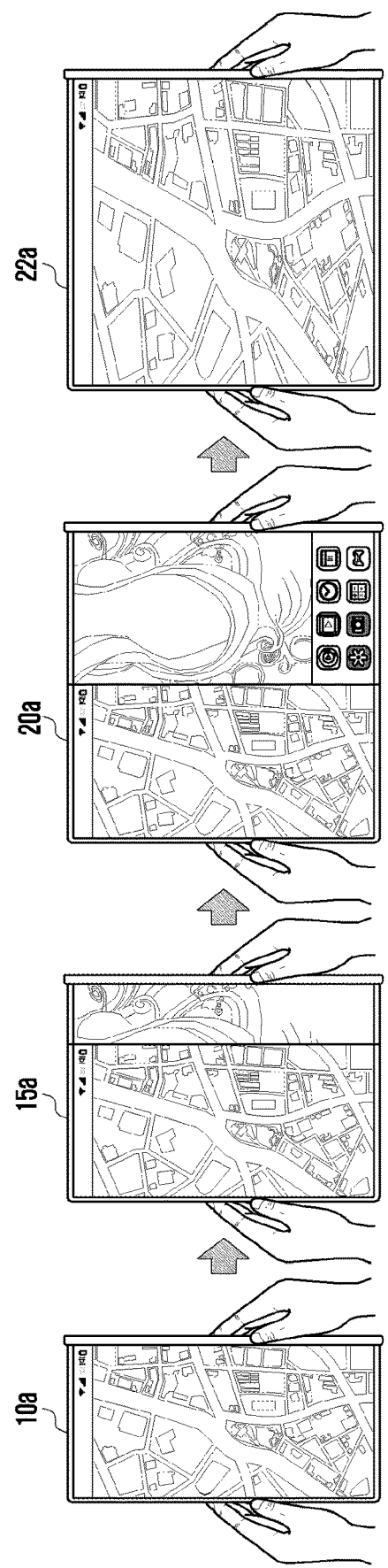
FIG. 10 is a diagram illustrating an expansion process of an electronic device according to various embodiments.

FIG. 10 is a diagram illustrating an expansion process of an electronic device according to various embodiments.

As described above with reference to FIG. 9, the display of the electronic device 600 may display a main content in an unexpanded state (10a). In this case, when a user's touch input is received, the processor 510 may expand the display 530 (15a). Thereafter, a process of displaying a background screen on an area of the display 530 which is expanded is the same as or similar to that of FIG. 9.

According to an embodiments, the processor 510 may display guide information on a split screen to a user while maintaining a main content screen and an app icon screen 2a. The processor 510 may terminate a split screen according to the user's selection, apply a final resolution to the main content being executed to fit the expanded area of the display 530, and display the main content in a full screen format (22a).

Figure 11:
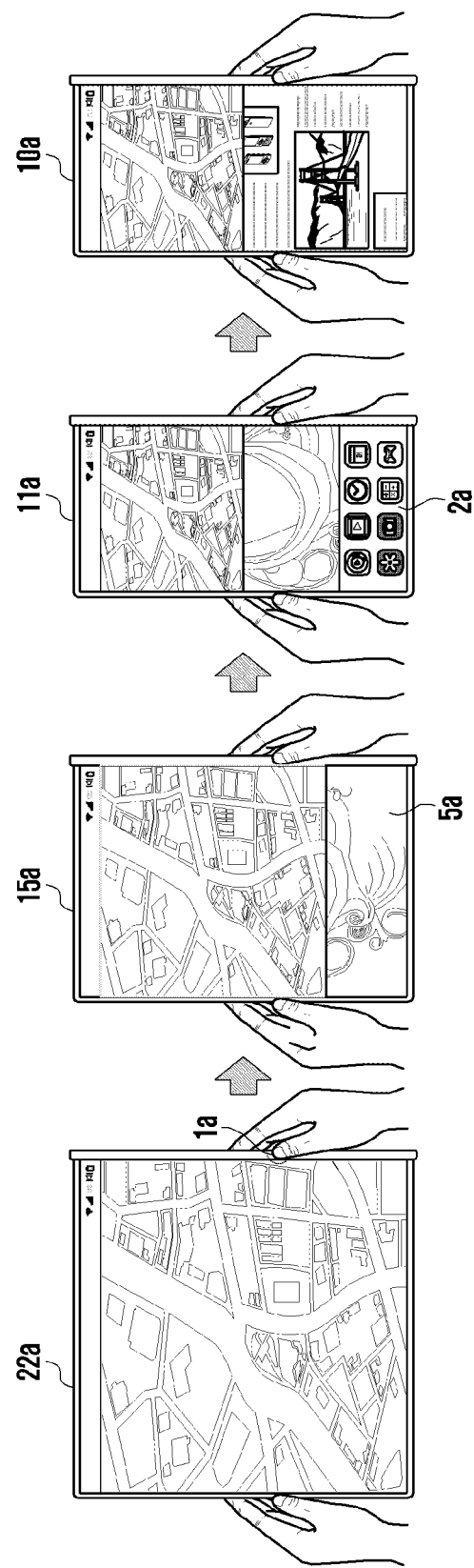
FIG. 11 is a diagram illustrating a reduction process of an electronic device according to various embodiments.

FIG. 11 is a diagram illustrating a reduction process of an electronic device according to various embodiments.

The display of the electronic device 600 may display a main content in an expanded state (22a). In this case, when a user's touch input is received, the processor 510 may reduce the display 530 (15a). The user's touch input may be located on a bezel area (1a). For example, the display 530 may be configured such that at least one expandable display area is reduced by a motor structure, or the display 530 may be configured to be manually reduced by a user's force. In this case, the processor 510 in an active state may reduce an execution screen of the main content being output (or in a foreground state) by a designated ratio to display the reduced execution screen in an upper end area of the display 530, and display a background screen 5a in an area other than the reduced execution screen of the main content. That is, the processor 510 may reduce the display area while maintaining an area where the main content is displayed, and adjust the size of the background screen 5a to correspond to the size of the reduced area. The expansion/reduction of the background screen may continue until the size change of the display is finished, and the processor 510 may stop the expansion/reduction of the background screen when the size change of the display is finished, and display an app icon screen 2a on the background screen (11a).

According to various embodiments, while the area of the display 530 is being reduced, the resolution of the main content may be fixed. The resolution of the main content is managed by a window manager service, and the DPU 631 may reduce the background screen 5a in real time to correspond to the area of the display 530 which is reduced. The DPU 631 may control a screen displayed on the display panel 636 through the display driver IC 635 via the display port 632. The background screen 5a managed by the DPU 631 may be displayed on the display panel 636 while the area of the display 530 is being reduced.

According to various embodiments, when the change of the area of the display 530 is stopped, the window manager service may update a graphic system by receiving final resolution information of the main content being executed. The processor 510 may display guide information on a split screen in a designated area on the display 530 to a user while maintaining a main content screen and the app icon screen 2a. According to a user's selection, the processor 510 may execute an app screen selected on the app icon screen 2a while maintaining the split screen.

Figure 12:
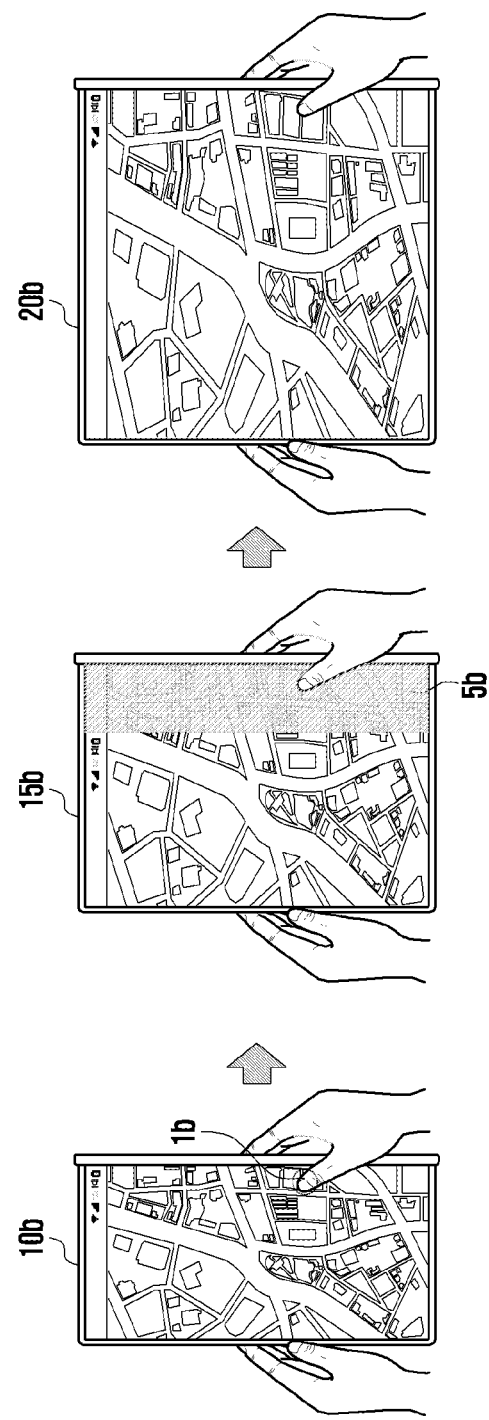
FIG. 12 is a diagram illustrating an expansion process of an electronic device according to various embodiments.

FIG. 12 is a diagram illustrating an expansion process of an electronic device according to various embodiments.

The display of the electronic device 600 may display a main content in an unexpanded state (10b). In this case, when a user's touch input is received, the processor 510 may expand the display 530 (15b). For example, the user's touch input may be located on an area of the display 530 (1b). The display 530 may be configured such that at least one expandable display area is expanded by a motor structure. In this case, the processor 510 may expand the display area while maintaining the resolution of the main content, or the display 530 may be configured to be manually expanded by a user's force. The processor 510 may enlarge and display a snapshot 5b, not a split screen, to correspond to the size of an area which is expanded. In this case, whether to express a split screen or a snapshot in the area which is expanded may vary according to a touch area 1b of the user. For example, when a predetermined part of the display area other than a bezel area is touched, the snapshot, not the split screen, may be expanded and displayed as shown in FIG. 12. In this case, the processor may distinguish a touch onto a predetermined part according to the x-axis and the y-axis divided based on a ratio of the display 530 or the electronic device 500 and a thickness of a bezel, and when it is ambiguous whether a user's touch input occurs in the area of the display 530 or in the bezel area, the processor may indicate guide information on a touch area. The processor 510 may provide a user with guide information on whether a touch input is a display touch input or a touch input for a bezel area, by dividing a touch area with reference to the x-axis and/or the y-axis, and may receive a touch input from the user once again and provide an operation (e.g., snapshot expansion display or split screen display) certainly according to the user's intention.

The snapshot 5b refers to a screen obtained by instantaneously capturing the main content being executed, and the snapshot 5b may be secured through the processor 510 (e.g., a CPU, a GPU, or a DPU). A series of processes of storing the snapshot 5b in the memory 520 and displaying the same on the display 530 has been described in detail with reference to FIG. 7 above. The expansion of the snapshot 5b may continue until the expansion of the display is completed, the processor 510 may expand or reduce the snapshot 5b in real time to provide, to the user, a feeling indicating that the main content is also expanded according to the expansion of the display 530. In this case, a scaler of the DPU 631 may be in charge of expanding or reducing the snapshot 5b, and may transparently display the snapshot 5b on a screen of the existing main content using an alpha blending function. The processor 510 may maintain the display of the snapshot 5b until the expansion of the display 530 is completed, and when the expansion of the display 530 is completed, the processor may stop the expansion of the snapshot 5b and display the main content to which a final resolution is applied, in a full screen format (20b).

According to various embodiments, while the area of the display 530 is being expanded, the resolution of the main content may be fixed. The resolution of the main content is managed by the window manager service 701, and the DPU 631 may expand the snapshot 5b in real time to correspond to the area of the display 530 which is expanded. The DPU 631 may control a screen displayed on the display panel 636 through the display driver IC 635 via the display port 632. The snapshot 5b managed by the DPU 631 may be displayed on the display panel 636 while the area of the display 530 is being expanded.

According to various embodiments, when the change of the area of the display 530 is stopped, the window manager service 701 may receive final resolution information of the main content being executed, and update the corresponding information to a graphic system. The processor 510 may update the area of the display 530 by receiving an image of the main content to which the final resolution is applied, deleting the snapshot 5b displayed on the display 530, and outputting a final resolution app image to the display 530.

Figure 13:
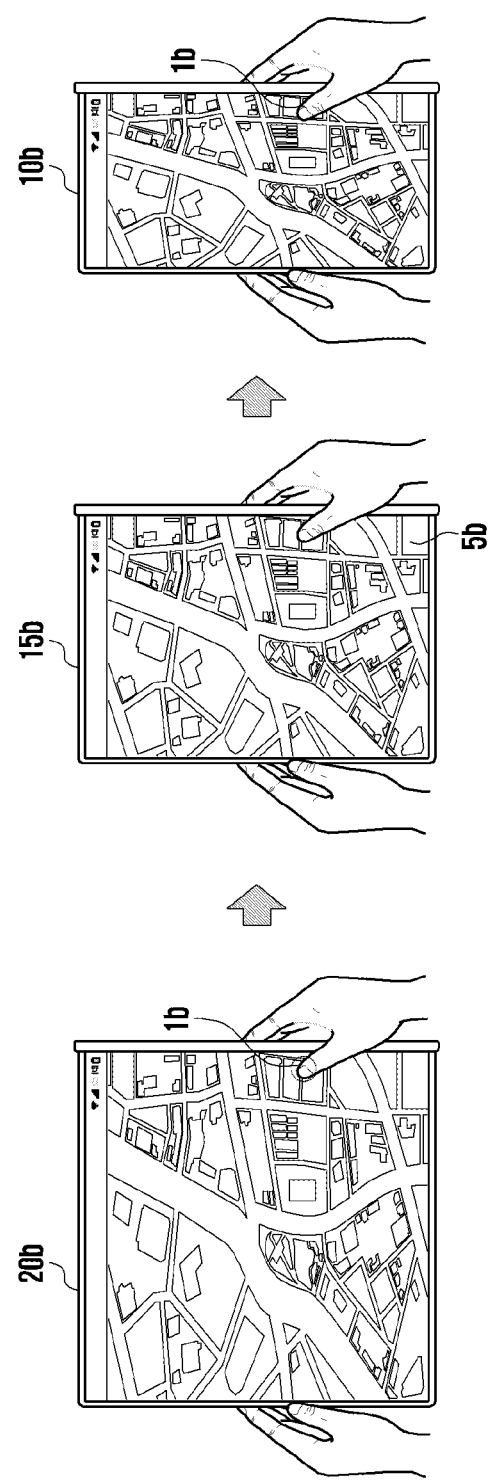
FIG. 13 is a diagram illustrating a reduction process of an electronic device according to various embodiments.

FIG. 13 is a diagram illustrating a reduction process of an electronic device according to various embodiments.

The display of the electronic device 600 may display a main content in an expanded state (20b). In this case, when a user's touch input is received, the processor 510 may reduce the display 530 (15b). For example, the user's touch input may be located on an area of the display 530 (1b). The display 530 may be configured such that at least one expandable display area is reduced by a motor structure. In this case, the processor 510 may reduce the display area while maintaining the resolution of the main content, or the display 530 may be configured to be manually expanded by a user's force. The processor 510 may reduce a snapshot 5b to correspond to the size of an area which is reduced, and display the reduced snapshot on the display 530.

The snapshot 5b refers to a screen obtained by instantaneously capturing the main content being executed, and the snapshot 5b may be secured through the processor 510 (e.g., a CPU, a GPU, or a DPU). A series of processes of storing the snapshot 5b in the memory 520 and displaying the same on the display 530 has been described in detail with reference to FIG. 7 above. The reduction of the snapshot 5b may continue until the reduction of the display is completed, the processor 510 may reduce the snapshot 5b in real time to provide, to the user, a feeling indicating that the main content is also reduced according to the reduction of the display 530. In this case, a scaler of the DPU 631 may be in charge of expanding or reducing the snapshot 5b, and may transparently display the snapshot 5b on a screen of the existing main content using an alpha blending function. The processor 510 may maintain the display of the snapshot 5b until the reduction of the display 530 is completed, and when the reduction of the display 530 is completed, the processor may stop the reduction of the snapshot 5b and display the main content to which a final resolution is applied (10b).

According to various embodiments, while the size of the area of the display 530 is being changed, the resolution of the main content may be fixed. The resolution of the main content is managed by the window manager service 701, and the DPU 631 may reduce the size of the snapshot in real time to correspond to the area of the display 530 which is reduced. In addition, the DPU 631 may control a screen displayed on the display panel 636 through the display driver IC 635 via the display port 632, and the snapshot 5b managed by the DPU 631 may be displayed on the display panel 636.

According to various embodiments, when the change of the area of the display 530 is stopped, the window manager service 701 may receive final resolution information of the main content being executed, and update the corresponding information to a graphic system. The processor 510 may receive an image of the main content to which the final resolution is applied, and display the image on the changed area of the display 530.

Figure 14:
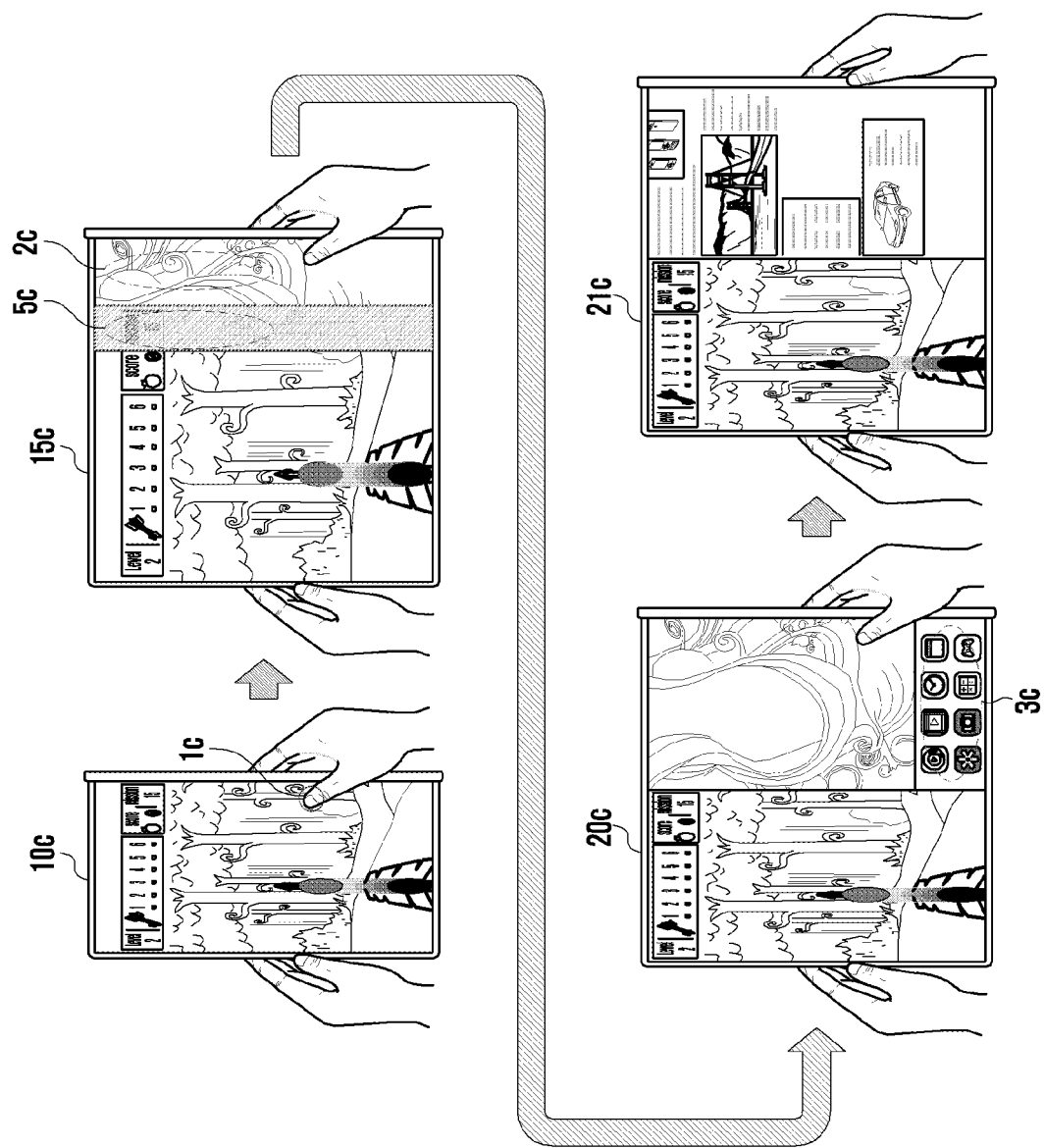
FIG. 14 is a diagram illustrating an enlargement process of an electronic device according to various embodiments.

FIG. 14 is a diagram illustrating an enlargement process of an electronic device according to various embodiments.

The display of the electronic device 600 may display a main content in an unexpanded state (10c). In this case, when a user's touch input is received, the processor 510 may expand the display 530 (15c). The user's touch input may be located on an area of the display 530 (1c). As described above with reference to FIG. 7, the application 702 (or main content) being executed on the electronic device 600 may correspond to an app which does not allow dynamic resolution change. The app which does not allow dynamic resolution change described below may be an application which does not support resolution and/or density change during runtime and is configured to be forcibly terminated when attempting to change the resolution.

Referring to FIG. 14, in a state where the display 530 is not expanded, the processor 530 may generate an execution screen of an application corresponding to the resolution and density of the corresponding area of the display 530 and display the execution screen on the area of the display 530. As described above, the app which does not allow dynamic resolution change may not support resolution change during runtime, and in this case, the app may be required to be terminated and re-executed to run on the display having a different resolution while running on the display 530 prior to expansion.

The processor 510 may display, on the display 530, a snapshot obtained by capturing an instantaneous screen of a dynamic resolution changing app, and expand the snapshot up to a size less than 1 cm and then reduce the snapshot back to provide a feedback feeling indicating that resolution change of the app is limited although a user's input is received (5c).

According to an embodiment, the display 530 may be configured such that at least one expandable display area is expanded by a motor structure. In this case, the processor 510 may expand the display area while maintaining an area where the main content is displayed, or the display 530 may be configured to be manually expanded by a user's force.

Even when a touch input is received on the area of the display 530, the processor 510 may expand and display a background screen 2c to correspond to the size of the area which is expanded. The expansion of the background screen may continue until the expansion of the display is completed, and the processor 510 may stop the expansion of the background screen when the expansion of the display is completed, and display an app icon screen 3c on the background screen (20c).

According to various embodiments, while the area of the display 530 is being expanded, the resolution of the main content may be fixed. The resolution of the main content is managed by a window manager service, and the DPU 631 may expand the background screen in real time to correspond to the area of the display 530 which is expanded. The DPU 631 may control a screen displayed on the display panel 636 through the display driver IC 635 via the display port 632. The background screen managed by the DPU 631 may be displayed on the display panel 636 while the area of the display 530 is being expanded.

According to various embodiments, when the change of the area of the display 530 is stopped, the window manager service may update a graphic system by receiving final resolution information of the main content being executed. The processor 510 may display guide information on a split screen to a user while maintaining a main content screen and an app icon screen 2c. According to a user's selection, the processor 510 may execute an app screen selected on the app icon screen 2c while maintaining the split screen (21c).

Figure 15:
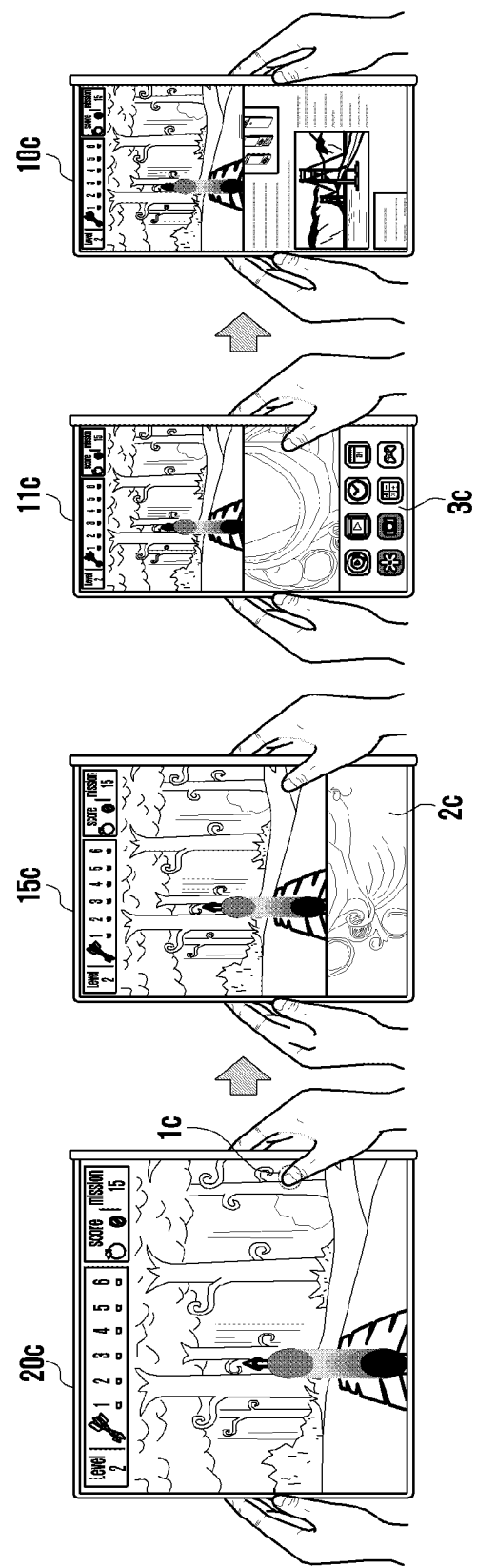
FIG. 15 is a diagram illustrating a reduction process of an electronic device according to various embodiments.

FIG. 15 is a diagram illustrating a reduction process of an electronic device according to various embodiments.

The display of the electronic device 600 may display a main content in an expanded state (20c). In this case, when a user's touch input is received, the processor 510 may reduce the display 530 (15c). The user's touch input may be located on an area of the display 530 (1c). As described above with reference to FIG. 7, the application 702 (or main content) being executed on the electronic device 600 may correspond to an app which does not allow dynamic resolution change. In this case, the processor 510 may display, on the display 530, a snapshot obtained by capturing an instantaneous screen of a dynamic resolution changing app, and expand the snapshot up to a size less than 1 cm and then reduce the snapshot back to provide a feedback feeling indicating that resolution change of the app is limited although a user's input is received.

According to an embodiment, the display 530 may be configured such that at least one expandable display area is reduced by a motor structure. In this case, the processor 510 may reduce the display area while maintaining an area where the main content is displayed, or the display 530 may be configured to be manually reduced by a user's force.

Even when a touch input is received on the area of the display 530, the processor 510 may display a background screen 2c to correspond to the size of the area which is reduced, instead of the snapshot. The change of the background screen 2c may continue until the reduction of the display is completed, and the processor 510 may stop the change of the size of the background screen 2c when the reduction of the display is completed, and display an app icon screen 3c on the background screen (11c).

According to various embodiments, while the area of the display 530 is being expanded, the resolution of the main content may be fixed. The resolution of the main content is managed by a window manager service, and the DPU 631 may change the background screen in real time to correspond to the area of the display 530 which is reduced. The DPU 631 may control a screen displayed on the display panel 636 through the display driver IC 635 via the display port 632. The background screen managed by the DPU 631 may be displayed on the display panel 636 while the area of the display 530 is being reduced.

According to various embodiments, when the change of the area of the display 530 is stopped, the window manager service may update a graphic system by receiving final resolution information of the main content being executed. The processor 510 may display guide information on a split screen to a user while maintaining a main content screen and an app icon screen 2c. According to a user's selection, the processor 510 may execute an app screen selected on the app icon screen 2c while maintaining the split screen.

An electronic device according to various example embodiments may include: a flexible display including a main display area and at least one expandable display area expandable from the main display area, and a processor operatively connected to the display, wherein the processor is configured to: control the display to display a first content on the main display having a first size while the electronic device is in a slide-in state, slide the display out to expand the display to a second size based on touch input information of the display area being received, control the display to display a second content in the expandable display area or the entire display area while the state of the electronic device is being switched into a slide-out state, and terminate the displaying of the second content and display the first content on at least a part of the display based on the switching of the state of the electronic device into the slide-out state being completed.

According to various example embodiments, the second content may include a background screen, and the processor may be configured to: control the display to display the first content in the main display area, and adjust and display a size of the background screen in real time to correspond to a size of the expandable display area in the expandable display area.

According to various example embodiments, the processor may be configured to: based on expansion of the display being completed, detect the completion through a display size detector, configure an environment of a split screen such that the split screen is split into the main display area and the expandable display area, and provide guide information on the split screen.

According to various example embodiments, the processor may be configured to control the display to display the first content in the main display area, and display a third content in the expandable display area, wherein the third content may include an app icon screen or an execution screen of an app selected on the app icon screen.

According to various example embodiments, the processor may be configured to terminate the split screen and update the first content to a final resolution to correspond to the entire display area having the second size.

According to various example embodiments, the second content may include a snapshot obtained by capturing the first content, and the processor may be configured to adjust and display a snapshot in real time to correspond to sizes of the main display area and the expandable display area while the state of the electronic device is being switched into the slide-out state.

According to various example embodiments, the processor may be configured to: based on expansion of the flexible display being completed, detect the completion through a display size detector, delete the snapshot screen displayed on the flexible display, and update a screen regarding the first content to a final resolution to correspond to the display area having the second size and display the updated screen.

According to various example embodiments, the first content may include an application which does not allow dynamic resolution change, the second content may include a background screen, and the processor may be configured to: control the display to display the first content in the main display area of the flexible display, and adjust and display a size of the background screen in real time to correspond to a size of the expandable display area in the expandable display area of the flexible display.

According to various example embodiments, the processor may be configured to: based on touch input being detected, control the display to display a snapshot obtained by instantaneously capturing the first content in the main display area, and expand the snapshot up to a size of 1 cm or less and reduce the snapshot back to the main display area, and adjust and display the size of the background screen in real time to correspond to the size of the expandable display area in the expandable display area of the flexible display.

According to various example embodiments, the processor may be configured to: based on the state of the electronic device being switched into the slide-out state, configure an environment of a split screen such that the split screen is split into the main display area and the expandable display area, and provide guide information on the split screen, control the display to display the first content in the main display area, and display a third content in the expandable display area, wherein the third content may include an app icon screen or an execution screen of an app selected on the app icon screen.

According to various example embodiments, the processor may be configured to terminate the split screen and update the first content to a final resolution to correspond to the entire display area having the second size.

An electronic device according to various example embodiments may further include: a housing, a flexible display including a bendable section, at least a part of which can be inserted into or withdrawn from an inner space of the housing, and a processor operatively connected to the display, wherein the processor is configured to: control the display to display a first content on the display having a first size, based on touch input information of the display area being received, slide the display in to reduce the display to a second size less than the first size, and additionally display a second content in the display area while the electronic device is in a slide-in state.

According to various example embodiments, the second content may include a background screen, the processor may be configured to: control the display to display a snapshot obtained by instantaneously capturing the first content in real time in an upper end area of the display to correspond to a size of the upper end area, and adjust and display a size of the background screen in real time in a remaining lower end area of the display to correspond to a size of the remaining lower end area, the upper end area may be determined via a horizontal length of the display and a vertical length corresponding to the horizontal length of the display while the electronic device is in the slide-in state, a ratio of the horizontal length and the vertical length may be maintained constant, and the lower end area of the display may correspond to a remaining area other than the upper end area of the display.

According to various example embodiments, the processor may be configured to: based on a slide-in operation of the electronic device being completed, detect the completion through a display size detector, and configure an environment of a split screen such that the split screen is split into the upper end area and the remaining lower end area, and provide guide information on the split screen.

According to various example embodiments, the second content may include a snapshot obtained by capturing the first content, and the processor may be configured to adjust and display the snapshot in an area of the display to correspond to a size of the display while the electronic device is in the slide-in state.

According to various example embodiments, the processor may be configured to: based on a slide-in operation of the electronic device being completed, delete the snapshot screen displayed on the display, and update a screen regarding the first content to a final resolution to correspond to an area having the second size and display the updated screen.

Figure 16:
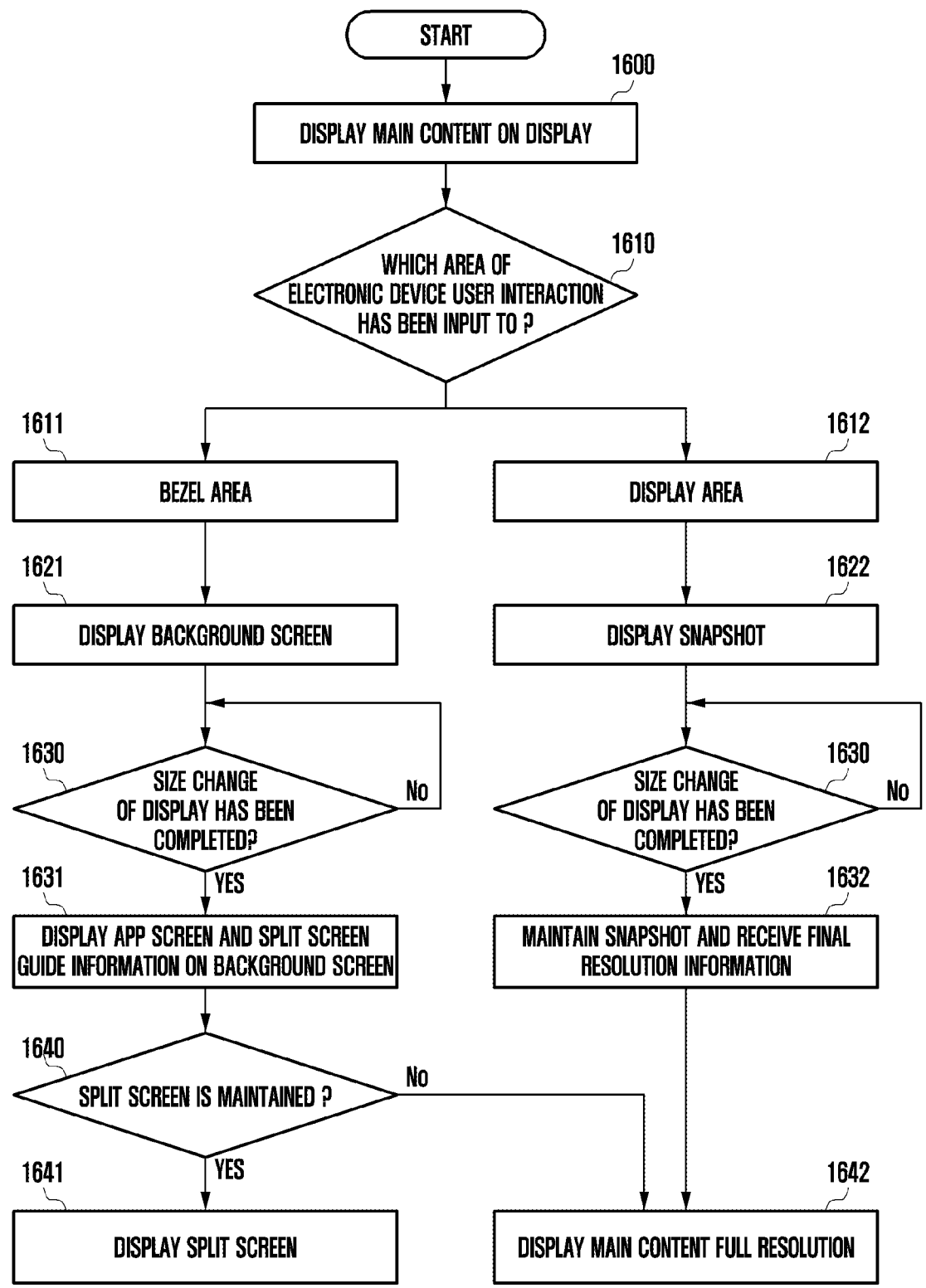
FIG. 16 is a flowchart illustrating an example control method of an electronic device according to various embodiments.

FIG. 16 is a flowchart illustrating an example control method of an electronic device according to various embodiments.

In operation 1600, the processor 510 of the electronic device 500 may display a main content on the display 530. In this case, a user may perform a touch input for expanding/reducing the display 530.

In operation 1610, the touch IC 721 may detect a touch input of the user and transmit the touch input to the touch driver 722. The touch driver 722 may transmit related touch information to the expandable area image management module 720, and based on the related touch information, the expandable area image management module 720 may determine the area of the electronic device 600 in which a user input has been made. The user input may be classified into a bezel area and an area of the display 530. When a touch sensor exists in the bezel area, a touch to the bezel area may be detected through the touch IC 721, and even in the case of an electronic device in which a touch sensor does not exist in a bezel area, when a touch input exists in a corner of the display 530 rather than an inner area of the display, the expandable area image management module 720 may determine that the user intends to expand/reduce the display while holding a bezel.

When it is determined in operation 1611 that the user input has occurred in the bezel area, as described above with reference to FIG. 7, a background screen may be displayed on an expandable display area through the DPU 731 via the expandable area image management module 720 and the expandable area image processing module 730 (1621).

In operation 1630, the virtual resolution management module 710 may receive the size of the display 530 through the display size detector 701, and determine whether the display 530 is currently being expanded/reduced or whether the size change of the display 530 has been completed. As a result of the determination, when the display 530 is being expanded or reduced, the virtual resolution management module 710 may continuously receive the size of the display 530 through the display size detector 701 until the size change of the display 530 is completed.

As a result of the determination, when the size change of the display 530 is completed, in operation 1631, the processor 530 may display an app screen on the background screen being displayed. In addition, the processor 530 may provide guide information on a split screen to a user. In operation 1640, the processor 530 may determine if the split screen is maintained and display the split screen and display a new app screen on the display 530 according to a selection of the guide information provided to the user (1641) when the split screen is maintained (Yes in operation 1640), or may stop the split screen and display the main content by applying a final resolution to the main content to correspond to the size of the expanded/reduced display 530 (1642) (No in operation 1640). In this case, a process of removing the background screen and applying the final resolution has been described in detail with reference to FIG. 7 above.

When it is determined in operation 1612 that the user input has occurred in the area of the display 530, as described above with reference to FIG. 7, a snapshot may be displayed in the expandable display area through the DPU 731 via the expandable area image management module 720 and the expandable area image processing module 730 (1621).

In operation 1630, the virtual resolution management module 710 may receive the size of the display 530 through the display size detector 701, and determine whether the display 530 is currently being expanded/reduced or whether the size change of the display 530 has been completed. As a result of the determination, when the display 530 is being expanded or reduced, the virtual resolution management module 710 may continuously receive the size of the display 530 through the display size detector 701 until the size change of the display 530 is completed.

As a result of the determination, when the size change of the display 530 is completed, in operation 1632, the processor 530 may receive final resolution information relating to the main content being executed while maintaining the snapshot. In relation to the final resolution of the main content being executed, a process of transmitting the final resolution, requesting application of the final resolution, rendering an image to which the final resolution is applied, and displaying an app image to which the final resolution is applied has been described in detail with reference to FIG. 7 above. The processor 530 (e.g., the DPU 731, the GPU, or the CPU) may receive information related to the final resolution of the main content and display an app image of the final resolution through the display panel 736.

In this case, an application being executed may correspond to an app which does not allow dynamic resolution change (e.g., a game app). For example, a game application described below may be an application which does not support resolution and/or density change during runtime and is configured to be forcibly terminated when attempting to change the resolution. In this case, the processor (e.g., the processor 510 of FIG. 5) may identify that the game application does not support resolution and/or density change during runtime and is configured to be forcibly terminated when attempting to change the resolution, based on attribute information of the game application.

The processor 510 may display an execution screen of an application corresponding to the resolution and density of the expanded/reduced display 530 in the expanded/reduced display 530, in response to a user touch input. For example, the processor 530 may maintain the same resolution as the execution screen having been displayed on the display 530 in a state before the expansion. In this case, the processor 510 may display, in an area other than an area where the execution screen is displayed on the display 530, a background screen having a size corresponding to the corresponding area. Thereafter, the virtual resolution management module 710 may determine that the change of the display 530 is completed, and transmit the final resolution to the window manager service 701. The window manager service 701 may request the application of the final resolution from the app being executed, and display an app image to which the final resolution is applied via the DPU 731 (1642). Accordingly, a screen may be seamlessly switched into the expandable display area even when the game application does not support real-time resizing.

A screen control method of an electronic device according to various example embodiments may include: displaying a first content on a main display having a first size, sliding the display out to expand the display to a second size exceeding the first size based on touch input information of a display area being received, and displaying a second content in an expandable display area or the entire display area while the state of the electronic device is being switched into a slide-out state.

According to various example embodiments, the displaying of the second content may include: displaying the first content in the main display area, displaying a background screen corresponding to a size of the expandable display area in the expandable display area, detecting whether a slide-out operation of the electronic device has been completed, through a display size detector, and configuring an environment of a split screen such that the split screen is split into the main display area and the expandable display area, and providing guide information on the split screen.

According to various example embodiments, the displaying of the second content may include: displaying a snapshot on the display, detecting whether a slide-out operation of the electronic device has been completed, through a display size detector, deleting the snapshot screen displayed on the display, and updating the first content to a final resolution to correspond to the entire display area having the second size.

According to various example embodiments, the displaying of the second content may include: displaying the first content in the main display area, displaying a background screen corresponding to a size of the expandable display area in the expandable display area, displaying a snapshot obtained by instantaneously capturing the first content in the main display area, detecting a user's touch input, expanding the snapshot in the main display area up to a size of 1 cm or less and then reducing the snapshot back to the main display, and configuring an environment of a split screen such that the split screen is split into the main display area and the expandable display area, and providing guide information on the split screen.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
 a flexible display comprising a display area including a main display area and at least one expandable display area expandable from the main display area; and
 at least one processor, comprising processing circuitry, operatively connected to the display,
 wherein the at least one processor, individually and/or collectively, is configured to:
 control the display to display a first content in the main display area having a first size while the electronic device is in a slide-in state;
 based on first touch input information of the display area being received, obtain a snapshot by capturing the first content displayed in the main display and slide the display out to expand the flexible display to a second size;
 display a second content in an entire display area including the main display area and viewable area of the expandable display area while the state of the electronic device is being switched into a slide-out state, the second content including the snapshot expanded to a size corresponding to the entire display area; and
 based on the switching of the state of the electronic device into the slide-out state being completed, terminate the displaying of the second content and display the first content on at least a part of the flexible display.

2. The electronic device of claim 1,
 wherein the at least one processor is configured to:

based on second touch input information of the display area being received, slide the display out to expand the flexible display to the second size, and display a background screen in the entire display area including the main display area and viewable area of the expandable display area while the state of the electronic device is being switched into a slide-out state; and while displaying the first content in the main display area, adjust and display a size of the background screen in real time to correspond to a size of the expandable display area in the expandable display area.

3. The electronic device of claim 2, wherein the at least one processor is configured to:

based on expansion of the display being completed, detect the completion through a display size detector; and configure an environment of a split screen such that the split screen is split into the main display area and the expandable display area, and provide guide information on the split screen.

4. The electronic device of claim 3, wherein the at least one processor is configured to:

control the display to display the first content in the main display area; and control the display to display a third content in the expandable display area, and wherein the third content comprises an application icon screen or an execution screen of an application selected on the application icon screen.

5. The electronic device of claim 3, wherein the at least one processor is configured to terminate the split screen and update the first content to a final resolution to correspond to the entire display area having the second size.

6. The electronic device of claim 1, wherein the at least one processor is configured to adjust and control the display to display the snapshot in real time to correspond to sizes of the main display area and the expandable display area while the state of the electronic device is being switched into the slide-out state.

7. The electronic device of claim 6, wherein the at least one processor is configured to:

based on expansion of the flexible display being completed, detect the completion through a display size detector;

delete the snapshot displayed on the flexible display; and update a screen regarding the first content to a final resolution to correspond to the display area having the second size and display the updated screen.

8. The electronic device of claim 1, wherein the first content comprises an application which does not allow dynamic resolution change.

9. The electronic device of claim 8, wherein the at least one processor is configured to:

based on a touch input being detected, display the snapshot obtained by instantaneously capturing the first content in the main display area, and expand the snapshot up to a size of 1 cm or less and then reduce the snapshot back to the main display area; and adjust and display the size of a background screen in real time to correspond to the size of the expandable display area in the expandable display area of the flexible display.

10. The electronic device of claim 9, wherein the at least one processor is configured to:

based on the state of the electronic device being switched into the slide-out state, configure an environment of a split screen such that the split screen is split into the main display area and the expandable display area, and provide guide information on the split screen;

control the display to display the first content in the main display area; and display a third content in the expandable display area, and wherein the third content comprises an application icon screen or an execution screen of an application selected on the application icon screen.

11. The electronic device of claim 10, wherein the at least one processor is configured to terminate the split screen and update the first content to a final resolution to correspond to the entire display area having the second size.

12. An electronic device comprising:

a housing;

a flexible display comprising a display area including a bendable section, at least a part of which is configured to be inserted into or withdrawn from an inner space of the housing; and at least one processor comprising processing circuitry operatively connected to the display, and wherein the at least one processor, individually and/or collectively, is configured to:

control the display to display a first content on the flexible display having a first size;

based on touch input information of the display area being received, slide the flexible display in to reduce the flexible display to a second size less than the first size;

control the display to display a second content in the display area while the electronic device is in a slide-in state, wherein the second content comprises a background screen;

control the display to display a snapshot obtained by instantaneously capturing the first content in real time in an upper end area of the flexible display to correspond to a size of the upper end area; and adjust and display a size of the background screen in real time in a remaining lower end area of the display to correspond to a size of the remaining lower end area, wherein the upper end area is determined based on a horizontal length of the display and a vertical length corresponding to the horizontal length of the display while the electronic device is in the slide-in state, wherein a ratio of the horizontal length and the vertical length is maintained to be constant, and wherein the lower end area of the display corresponds to a remaining area other than the upper end area of the display.

13. The electronic device of claim 12, wherein the processor is configured to:

based on a slide-in operation of the electronic device being completed, detect the completion through a display size detector; and configure an environment of a split screen such that the split screen is split into the upper end area and the remaining lower end area, and provide guide information on the split screen.

14. The electronic device of claim 12, wherein the at least one processor is configured to adjust and display the snapshot in an area of the display to correspond to a size of the display while the electronic device is in the slide-in state.

15. The electronic device of claim 14, wherein the at least one processor is configured to:

based on a slide-in operation of the electronic device being completed, delete the snapshot displayed on the display; and update a screen regarding the first content to a final resolution to correspond to an area having the second size and display the updated screen.

16. A screen control method of an electronic device, wherein the electronic device comprises: a flexible display comprising a display area including a main display area and at least one expandable display area expandable from the main display area; and at least one processor comprising processing circuitry, wherein the screen control method comprises:

displaying a first content on the main display area having a first size while the electronic device is in a slide-in state;

based on first touch input information of the display area being received, obtaining a snapshot by capturing the first content displayed in the main display and sliding the display out to expand the flexible display to a second size exceeding the first size;

displaying a second content in an entire display area including the main display area and viewable area of the expandable display area while a state of the electronic device is being switched into a slide-out state, the second content including the snapshot expanded to a size corresponding to the entire display area; and based on the switching of the state of the electronic device into the slide-out state being completed, terminate the displaying of the second content and display the first content on at least a part of the flexible display.

17. The method of claim 16, comprising, based on second touch input information of the display area being received;

sliding the display out to expand the flexible display to a second size, displaying a background screen corresponding to a size of the expandable display area while the state of the electronic device is being switched into a slide-out state;

detecting whether a slide-out operation of the electronic device has been completed, through a display size detector; and based on the switching of the state of the electronic device into the slide-out state being completed, configuring an environment of a split screen such that the split screen is split into the main display area and the expandable display area, and providing guide information on the split screen.

18. The method of claim 16, wherein the displaying of the second content comprises:

updating the first content to a final resolution to correspond to the entire display area having the second size.

19. The method of claim 16, comprising, based on second touch input information of the display area being received:

displaying the first content in the main display area;

displaying a background screen corresponding to a size of the expandable display area while the state of the electronic device is being switched into a slide-out state; and configuring an environment of a split screen such that the split screen is split into the main display area and the expandable display area, and providing guide information on the split screen.

* * * * *